United States Patent
Maikawa et al.

(10) Patent No.: US 10,250,071 B2
(45) Date of Patent: Apr. 2, 2019

(54) WIRELESS POWER SUPPLY COIL

(71) Applicant: NISSAN MOTOR CO., LTD., Yokohama-shi, Kanagawa (JP)

(72) Inventors: Kengo Maikawa, Kanagawa (JP); Satoshi Kubota, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/302,350

(22) PCT Filed: Apr. 8, 2014

(86) PCT No.: PCT/JP2014/060197
§ 371 (c)(1),
(2) Date: Oct. 6, 2016

(87) PCT Pub. No.: WO2015/155835
PCT Pub. Date: Oct. 15, 2015

(65) Prior Publication Data
US 2017/0033606 A1 Feb. 2, 2017

(51) Int. Cl.
*H02J 50/10* (2016.01)
*H02J 50/60* (2016.01)
*H02J 50/90* (2016.01)
*H02J 7/02* (2016.01)
(Continued)

(52) U.S. Cl.
CPC ............. *H02J 50/10* (2016.02); *H02J 7/025* (2013.01); *H02J 50/70* (2016.02); *H02J 50/80* (2016.02)

(58) Field of Classification Search
CPC .. H02J 50/10; H02J 50/60; H02J 50/70; H02J 50/90; H02J 7/025; Y02T 10/7005
See application file for complete search history.

(56) References Cited

U.S. PATENT DOCUMENTS

| | | | |
|---|---|---|---|
| 2013/0135077 A1 | 5/2013 | Shijo et al. | |
| 2015/0091511 A1* | 4/2015 | Ichikawa | H02J 5/005 320/108 |

(Continued)

FOREIGN PATENT DOCUMENTS

| | | |
|---|---|---|
| JP | 2010-172084 A | 8/2010 |
| JP | 2013-106477 A | 5/2013 |
| JP | 2013-172500 A | 9/2013 |

(Continued)

OTHER PUBLICATIONS

Trnaslation of JP-2010172084.*

*Primary Examiner* — Rexford Barnie
*Assistant Examiner* — Elim Ortiz
(74) *Attorney, Agent, or Firm* — Foley & Lardner LLP

(57) ABSTRACT

A magnetic core 47 to be housed in a coil bobbin 57 is split along a coil-axis intersecting direction Y into a plurality of split magnetic cores 47a, the coil-axis intersecting direction Y intersecting a coil axis direction X, and a clearance C extending along the coil axis direction X is provided between the plurality of split magnetic cores 47a. In each clearance C, a protrusion 51a protruding upward from a core base 51 is inserted and arranged to ensure sufficient rigidity. Providing the clearances C reduces the entire weight of the magnetic core 47 and also ensures a large coil width in the coil-axis intersecting direction Y. By ensuring a large coil width, alignment between a power-transmission-side coil 11 and a power-reception-side coil 13 becomes easier.

7 Claims, 25 Drawing Sheets

(51) Int. Cl.
H02J 50/80 (2016.01)
H02J 50/70 (2016.01)

(56) References Cited

U.S. PATENT DOCUMENTS

2015/0137925 A1   5/2015  Abe et al.
2017/0054475 A1*  2/2017  Itoh .................... H04B 5/0087

FOREIGN PATENT DOCUMENTS

WO   WO 2013/168241 A1   11/2013
WO   WO 2013/183665 A1   12/2013

* cited by examiner

FIG. 3
(a)
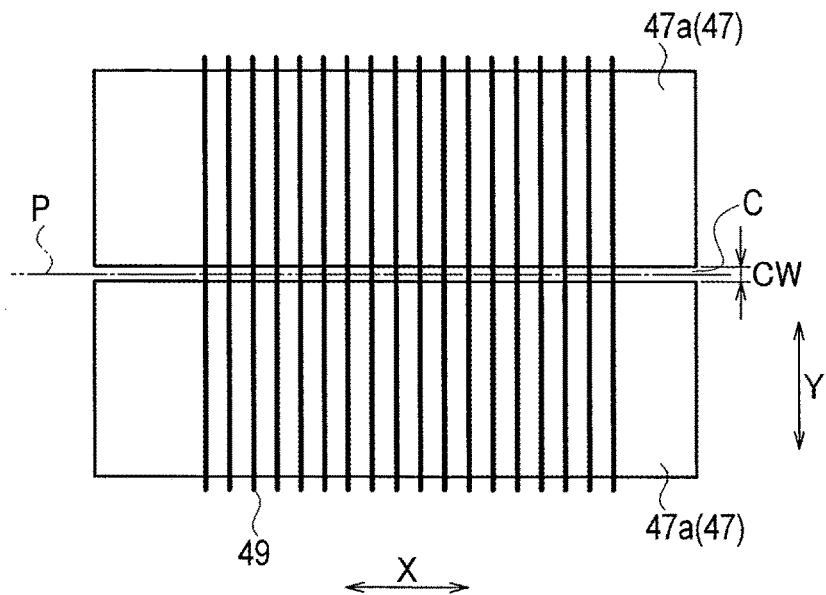
(b)
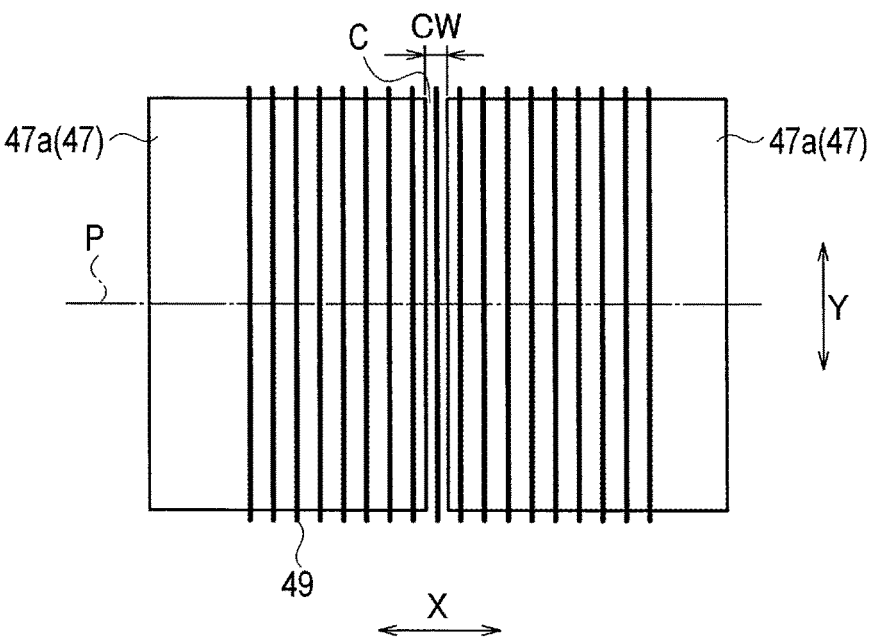

FIG. 6
(a)
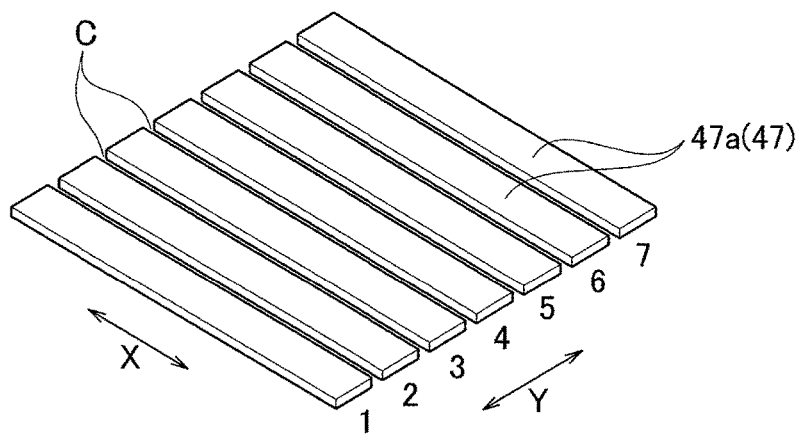
(b)
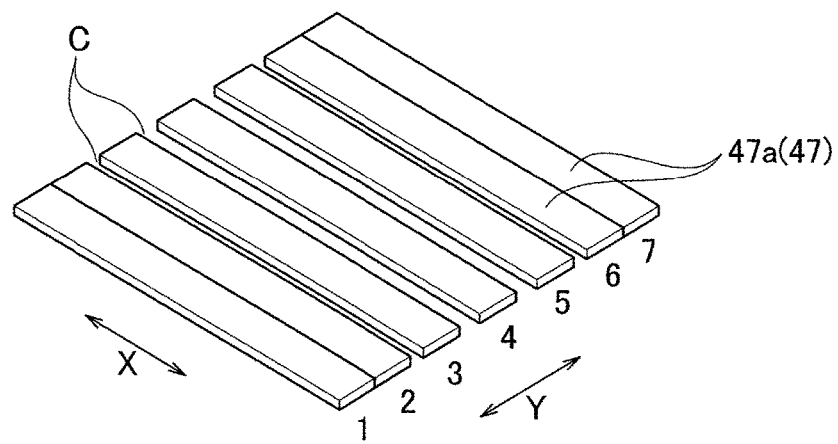

FIG. 7
(a)
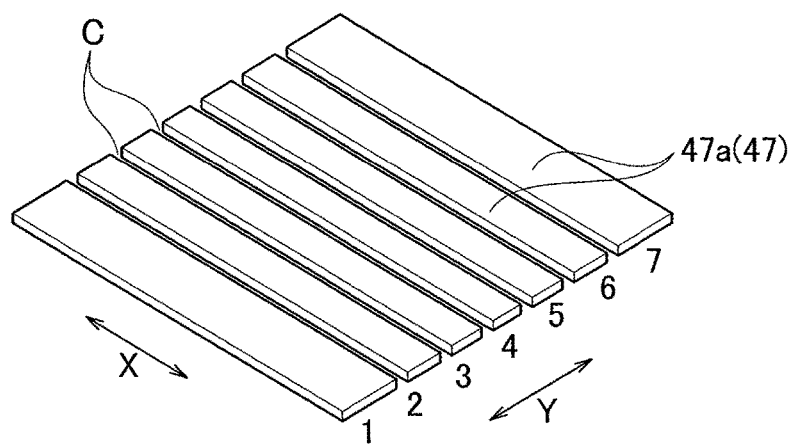
(b)
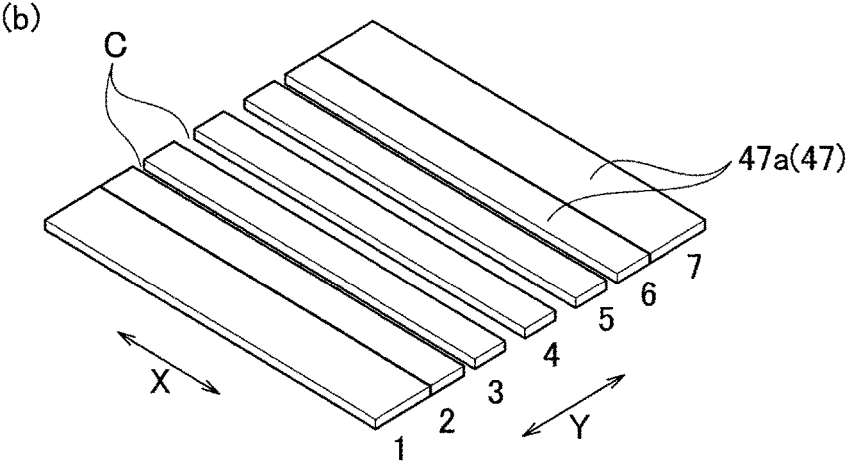

FIG. 8
(a)
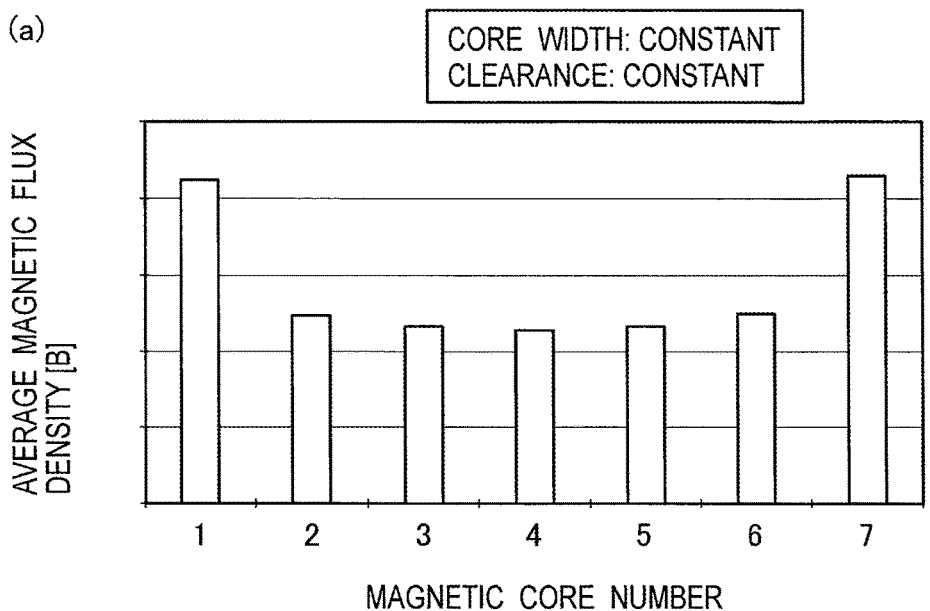
(b)
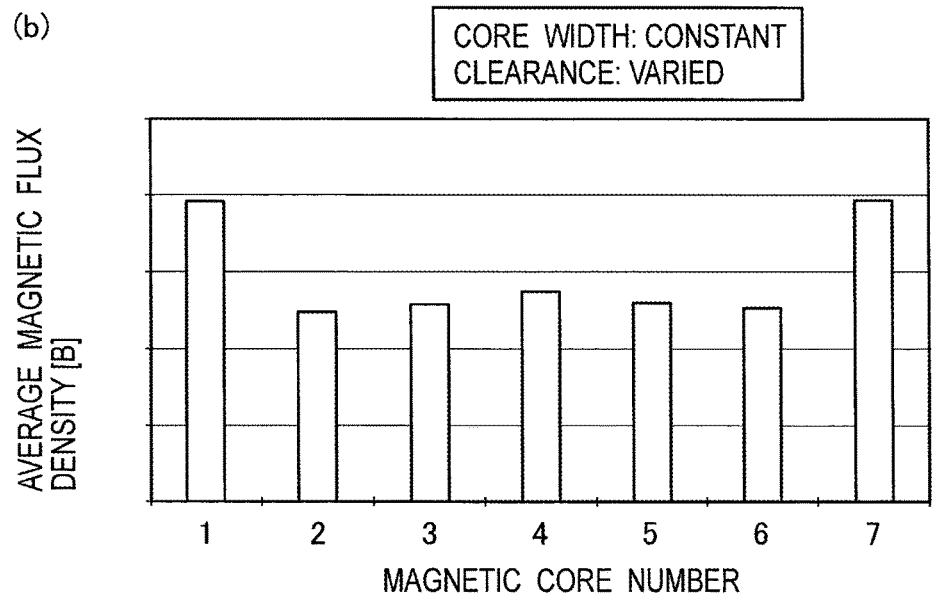

FIG. 9
(a)
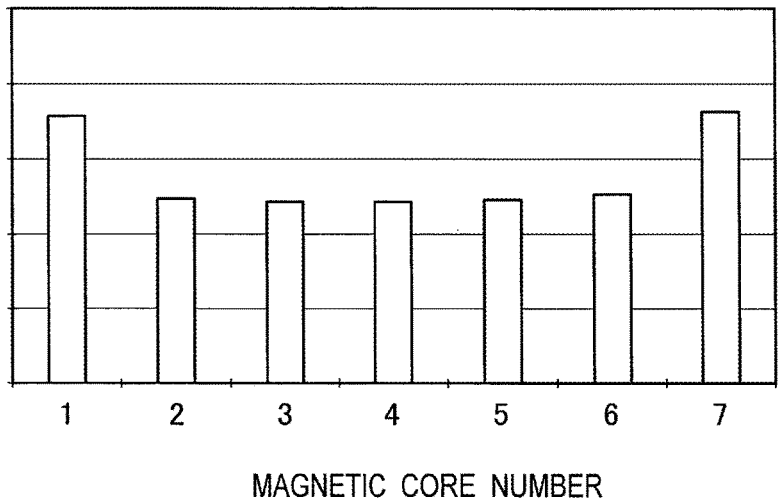
(b)
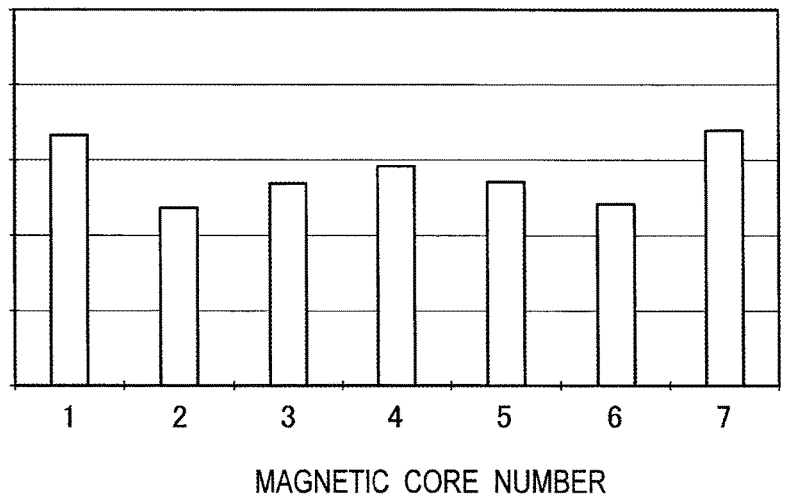

FIG. 10
(a)
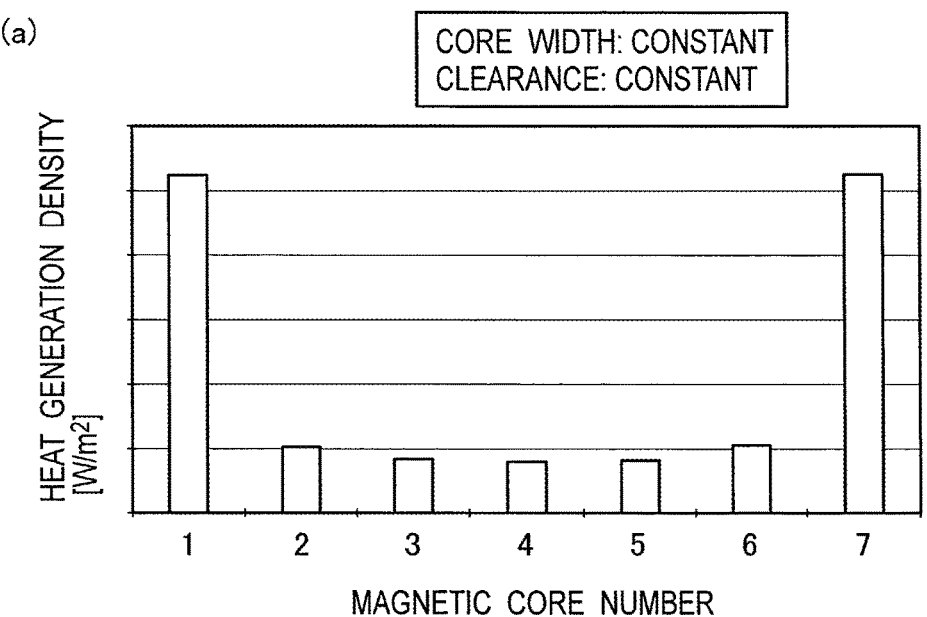
(b)
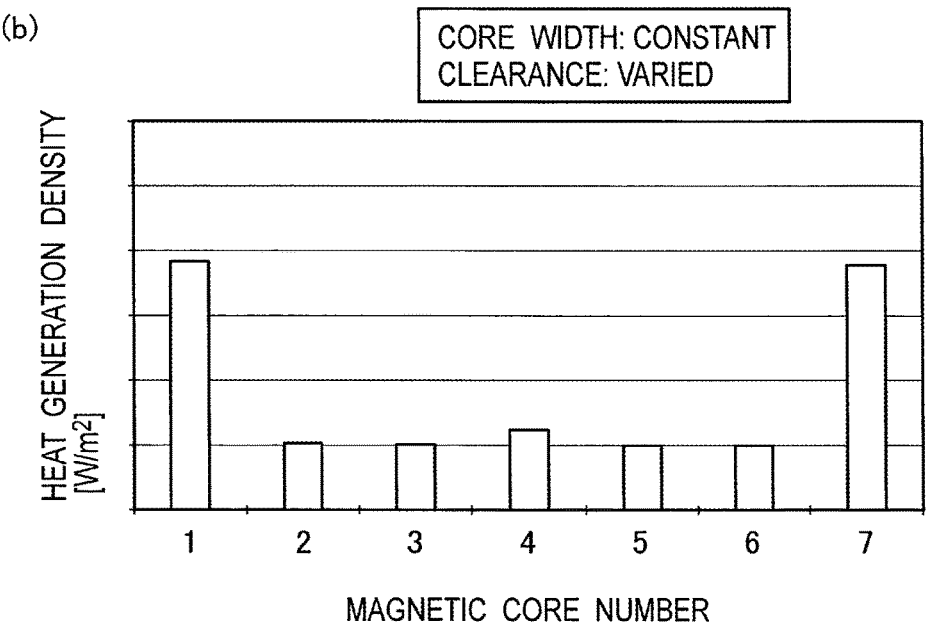

FIG. 11
(a)
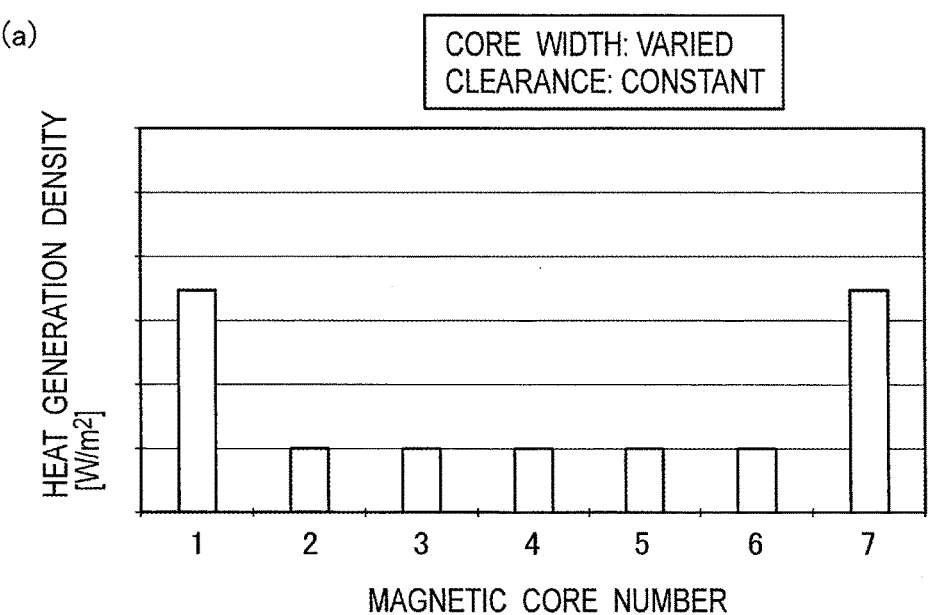
(b)
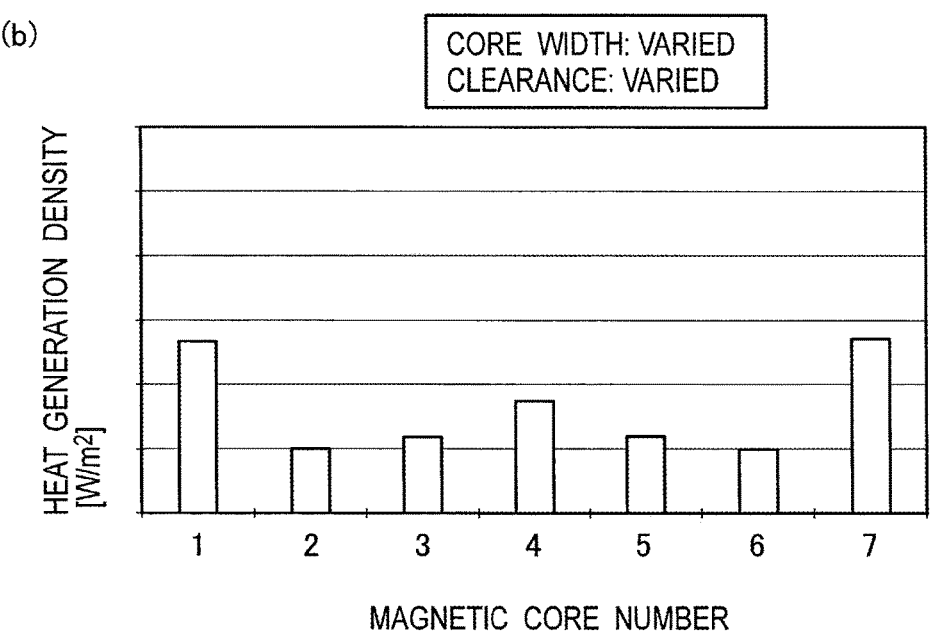

FIG. 20
(a)
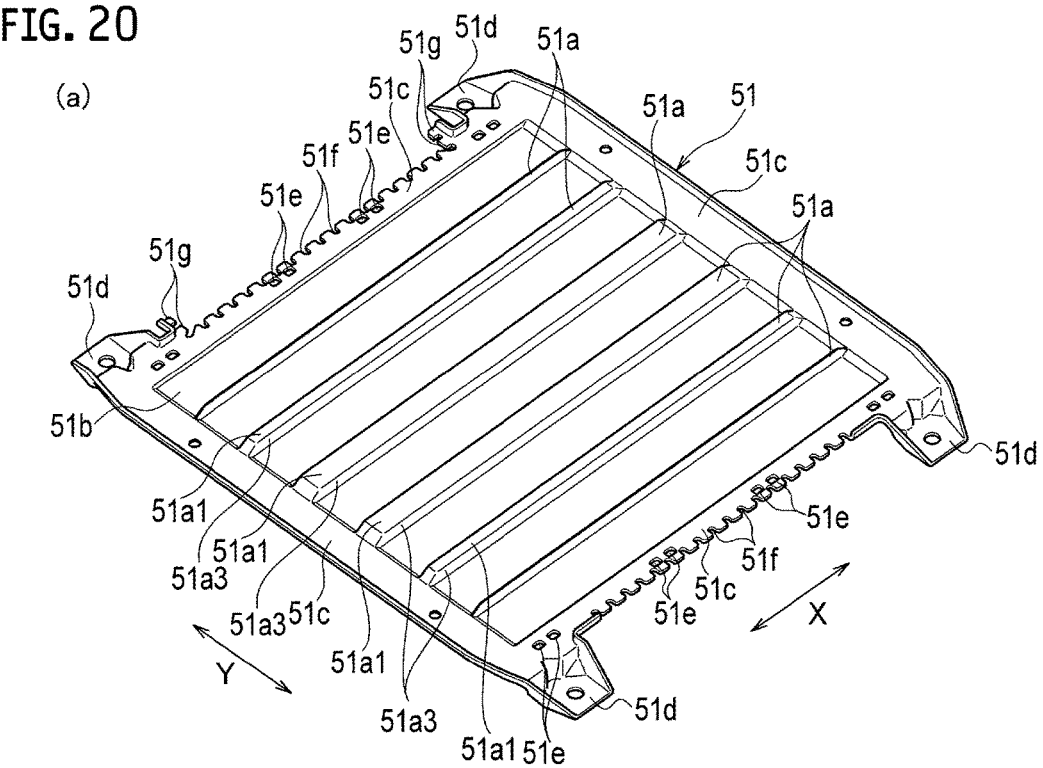
(b)
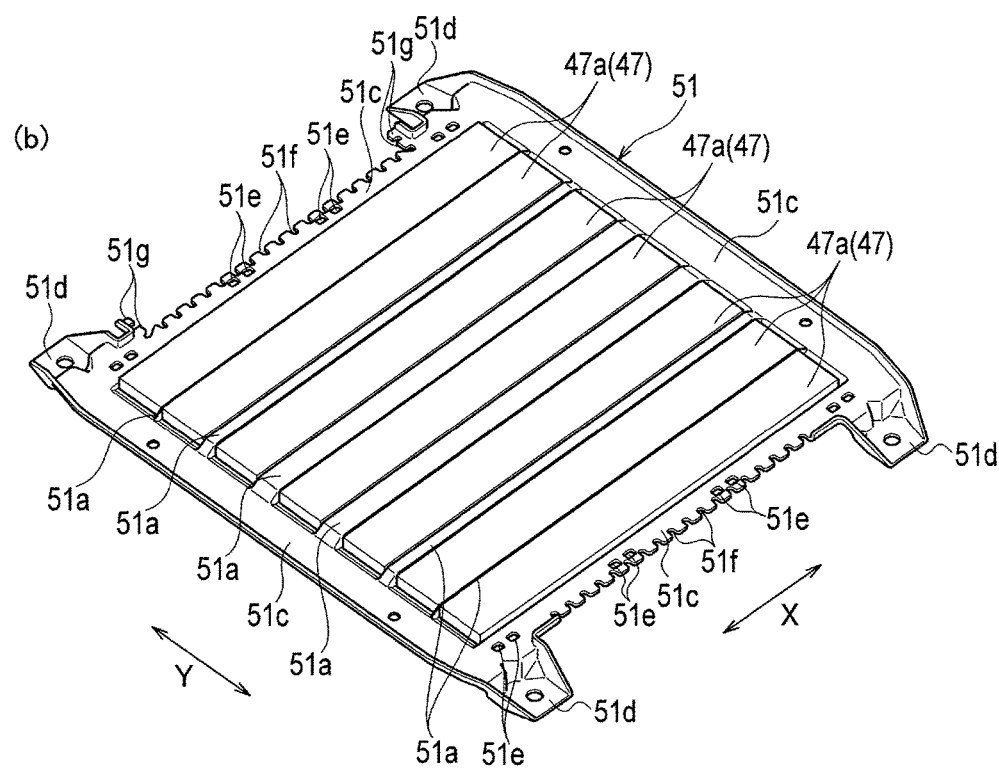

FIG. 21
(a)
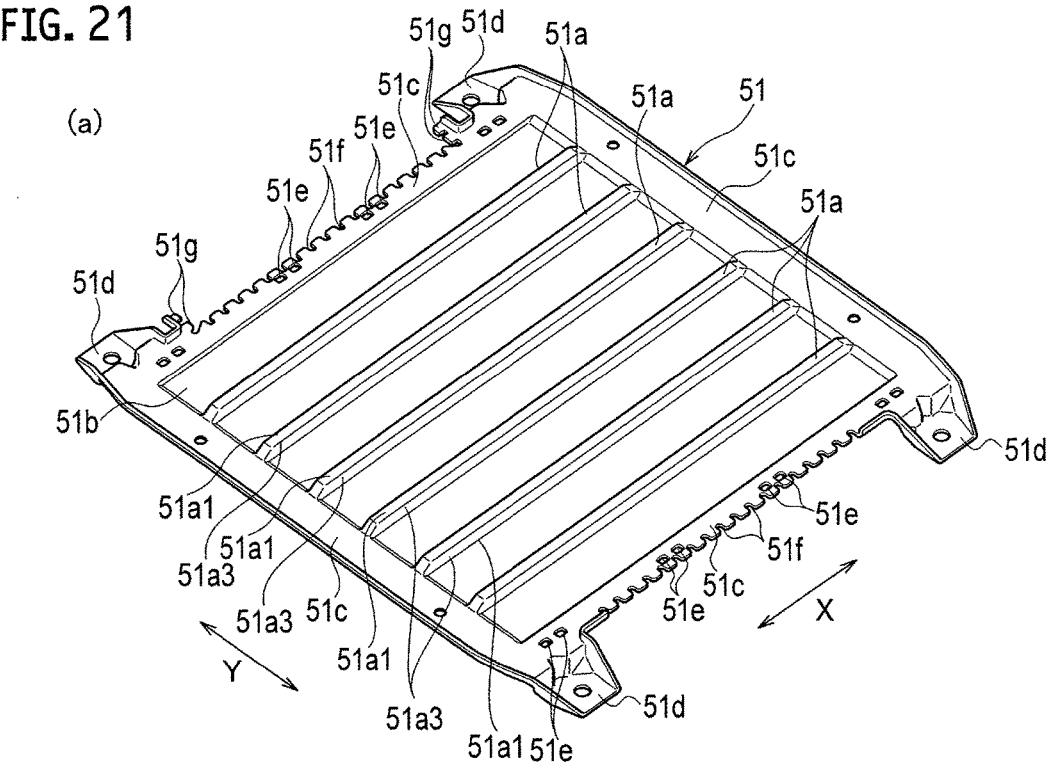
(b)
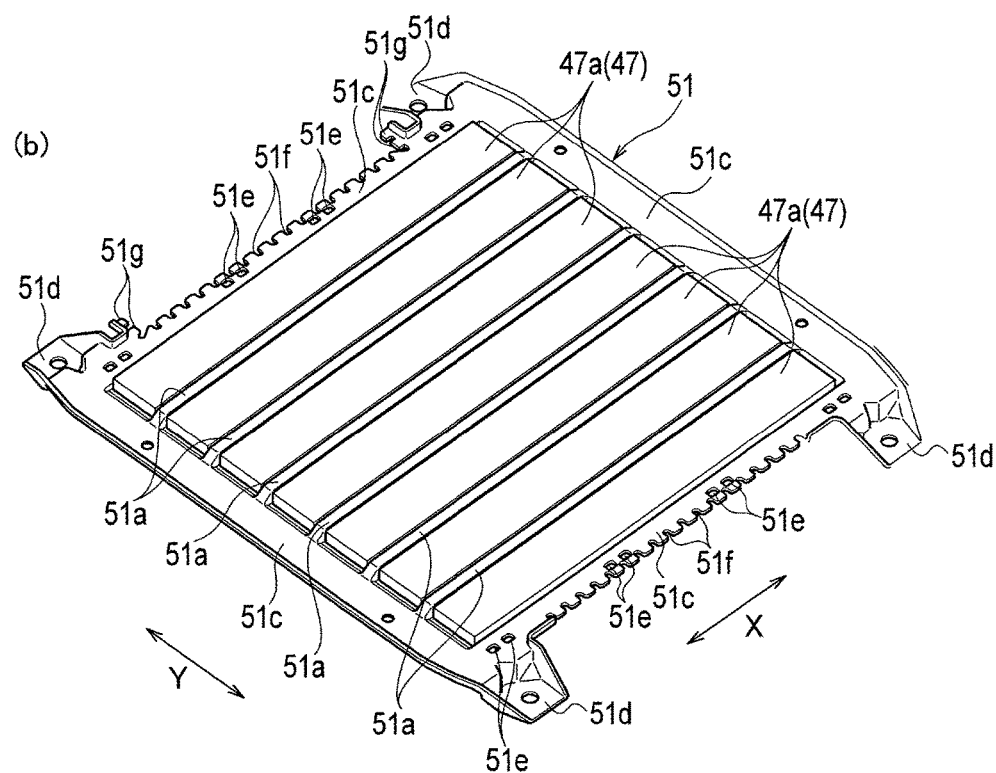

WIRELESS POWER SUPPLY COIL

TECHNICAL FIELD

The present invention relates to a wireless power supply coil configured to wirelessly transmit or receive power.

BACKGROUND ART

Patent Literature 1 listed below discloses a technique in which power is supplied from a power-transmission-side coil installed on the ground to a power-reception-side coil mounted on the lower surface of the vehicle body of an automobile by electromagnetic induction effect. Here, what is called a solenoid coil, obtained by winding a coil around a flat plate-shaped magnetic body, is used as each of the power-transmission-side coil and the power-reception-side coil.

CITATION LIST

Patent Literature

Patent Literature 1: Japanese Patent Application Publication No. 2013-172500

SUMMARY OF INVENTION

Technical Problem

Meanwhile, in order to efficiently supply power to the power-reception-side coil, which is mounted on the vehicle, the power-reception-side coil needs to be aligned with the power-transmission-side coil on the ground. To make this alignment easier, the widths of the power transmission and reception coils (magnetic bodies), which generate a magnetic flux, may be increased so that the amount of tolerance for offset between these coils in the vehicle width direction can be increased. In this case, however, the magnetic bodies increase in size, which leads to increase in weight.

In view of this, an object of the present invention is to enable easier alignment between a power-reception-side coil and a power-transmission-side coil while suppressing increase in coil weight.

Solution to Problem

The present invention provides a wireless power supply coil in which a magnetic body arranged inside an annular conductive wire is split along a coil-axis intersecting direction into a plurality of split magnetic bodies, the coil-axis intersecting direction intersecting a coil axis direction of the coil, with the conductive wire wound around the magnetic body, and a clearance extending along the coil axis direction is provided between the plurality of split magnetic bodies.

Advantageous Effects of Invention

In the present invention, a clearance extending along the coil axis direction is provided between a plurality of split magnetic bodies into which a magnetic body is split along the coil-axis intersecting direction. This ensures a large coil width in the coil-axis intersecting direction while reducing the weight of the entire magnetic body. By ensuring a large coil width, alignment between the power-reception-side coil and the power-transmission-side coil becomes easier. Moreover, the clearance provided between the split magnetic bodies can suppress increase in weight accordingly.

In wireless power supply, the total amount of magnetic flux formed between a primary coil and a secondary coil is less than that of a transformer since the air gap between the two coils acts as a magnetic resistance. Here, a magnetic flux that flows inside a magnetic body is directed in the coil axis direction; however, in the case of the wireless power supply, in which the total amount of magnetic flux is originally small, providing a clearance extending along the coil axis direction somewhat reduces the magnetic path but does not greatly influence the performance (self-inductance and coupling coefficient). In contrast, in a case where a magnetic body is split along the coil axis direction into a plurality of split magnetic bodies with a clearance extending along the coil-axis intersecting direction, the clearance is present in the direction of flow of magnetic flux (magnetic path). In this case, the clearance acts as an air gap and increases the magnetic resistance, thereby causing a large loss.

BRIEF DESCRIPTION OF DRAWINGS

FIG. 3 is a plan view showing the embodiment (a) of the present invention and a comparative example (b) in a simplified fashion with two split magnetic cores.

Part (a) of FIG. 6 is a perspective view of a magnetic core with split magnetic cores having an equal width in the coil-axis intersecting direction and clearances having an equal width as well, and Part (b) of FIG. 6 is a perspective view of a magnetic core with split magnetic cores having an equal width in the coil-axis intersecting direction and clearances having different widths.

Part (a) of FIG. 7 is a perspective view of a magnetic core with split magnetic cores having different widths in the coil-axis intersecting direction and clearances having an equal width, and Part (b) of FIG. 7 is a perspective view of a magnetic core with split magnetic cores having different widths in the coil-axis intersecting direction and clearances having different widths as well.

Part (a) of FIG. 8 is a correlation chart between each of the plurality of split magnetic cores in Part (a) of FIG. 6 and the average density of magnetic flux flowing through the split magnetic core, and Part (b) of FIG. 8 is a correlation chart between each of the plurality of split magnetic cores in Part (b) of FIG. 6 and the average density of magnetic flux flowing through the split magnetic core.

Part (a) of FIG. 9 is a correlation chart between each of the plurality of split magnetic cores in Part (a) of FIG. 7 and the average density of magnetic flux flowing through the split magnetic core, and Part (b) of FIG. 9 is a correlation chart between each of the plurality of split magnetic cores in Part (b) of FIG. 7 and the average density of magnetic flux flowing through the split magnetic core.

Part (a) of FIG. 10 is a correlation chart between each of the plurality of split magnetic cores in Part (a) of FIG. 6 and the heat generation density at the split magnetic core, and Part (b) of FIG. 10 is a correlation chart between each of the plurality of split magnetic cores in Part (b) of FIG. 6 and the heat generation density at the split magnetic core.

Part (a) of FIG. 11 is a correlation chart between each of the plurality of split magnetic cores in Part (a) of FIG. 7 and the heat generation density at the split magnetic core, and Part (b) of FIG. 11 is a correlation chart between each of the plurality of split magnetic cores in Part (b) of FIG. 7 and the heat generation density at the split magnetic core.

Figure 12:
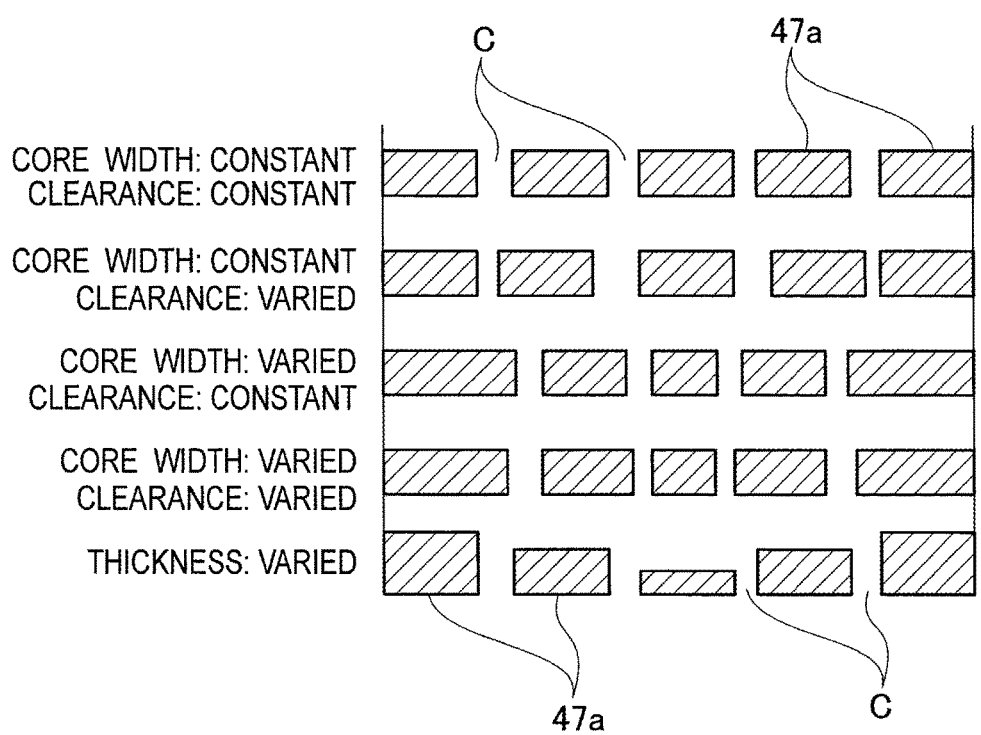

FIG. 12 is a set of cross-sectional views of the magnetic cores in Parts (a) and (b) of FIG. 6 and Parts (a) and (b) of FIG. 7 as well as a magnetic core with split magnetic cores having different thicknesses.

Figure 13:
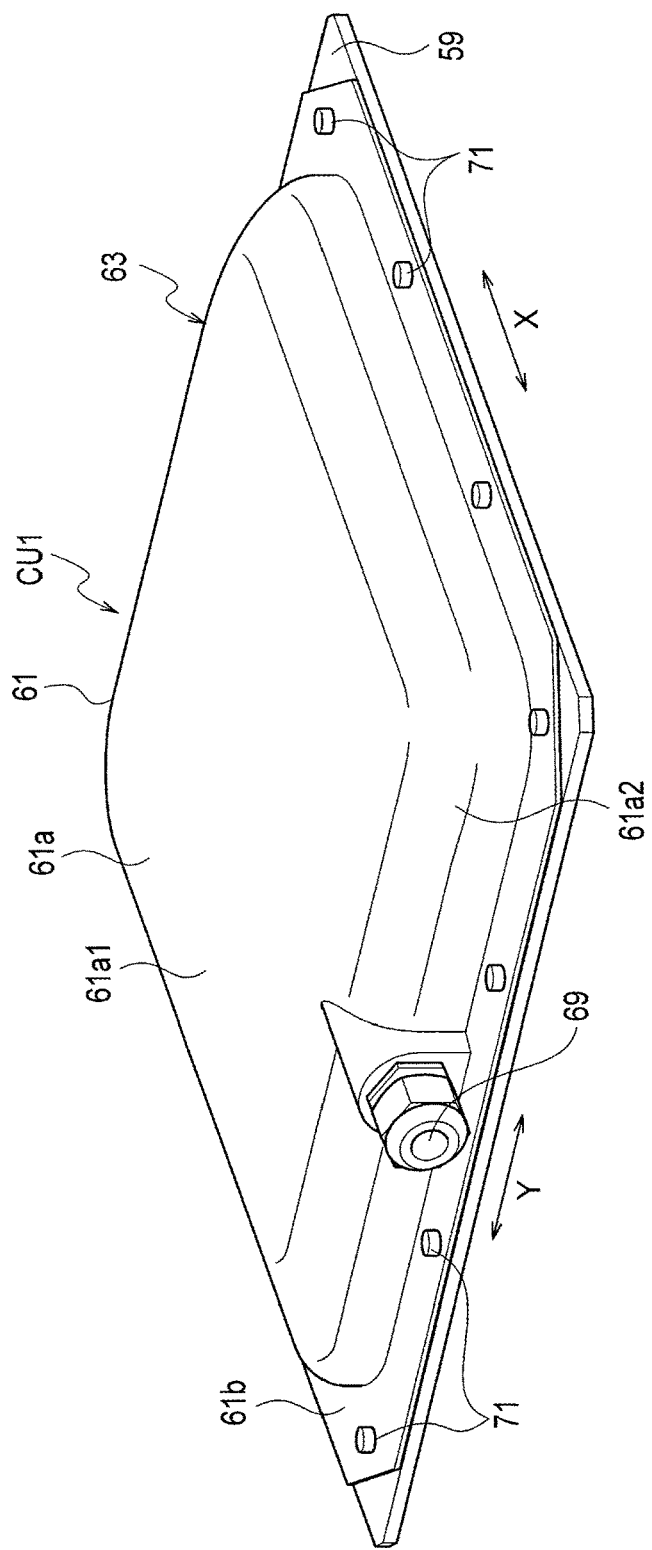

FIG. 13 is a perspective view of a power-transmission-side coil unit.

Figure 14:
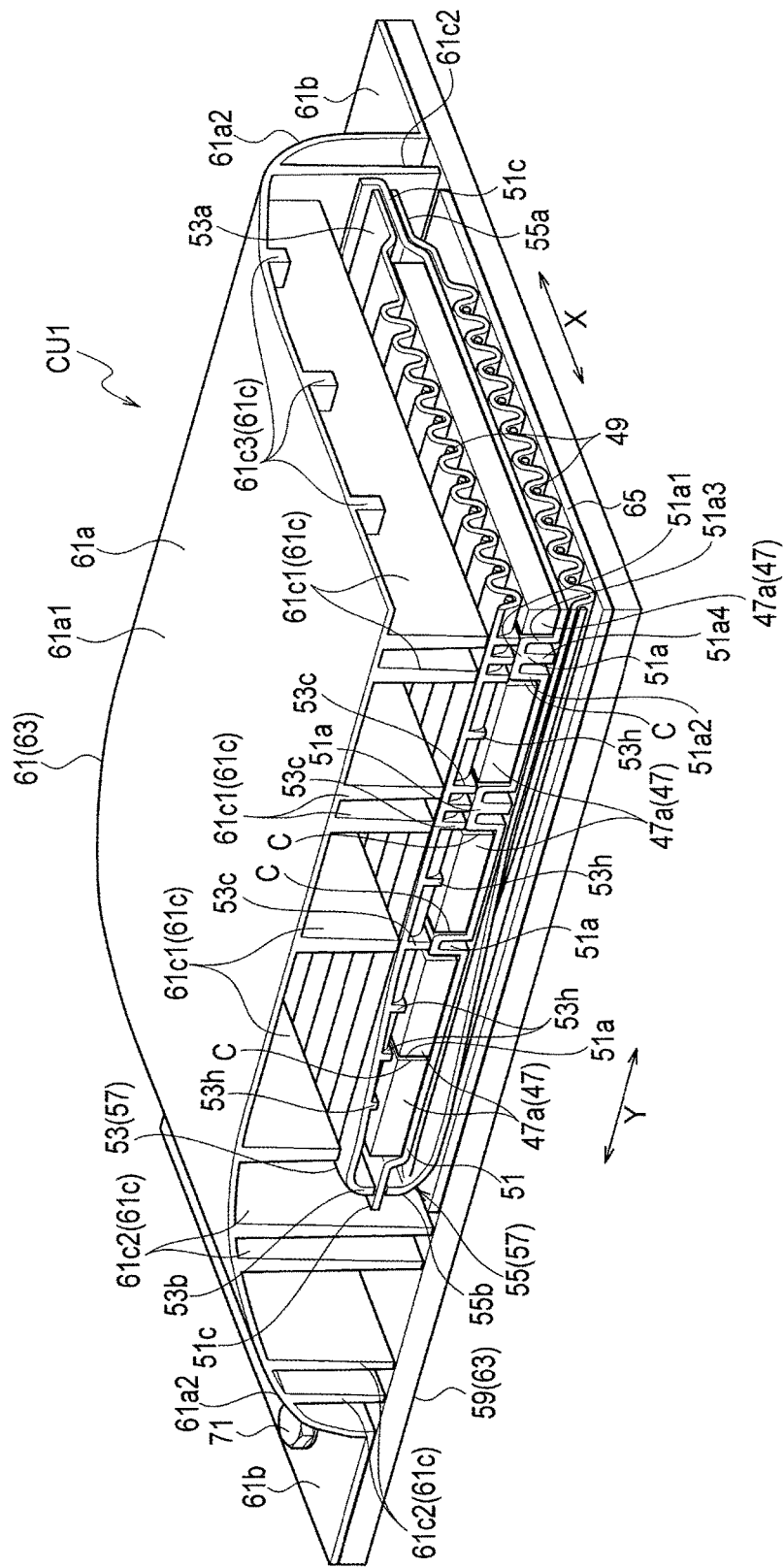

FIG. 14 is a perspective cross-sectional view showing the internal structure of the power-transmission-side coil unit in FIG. 13.

Figure 15:
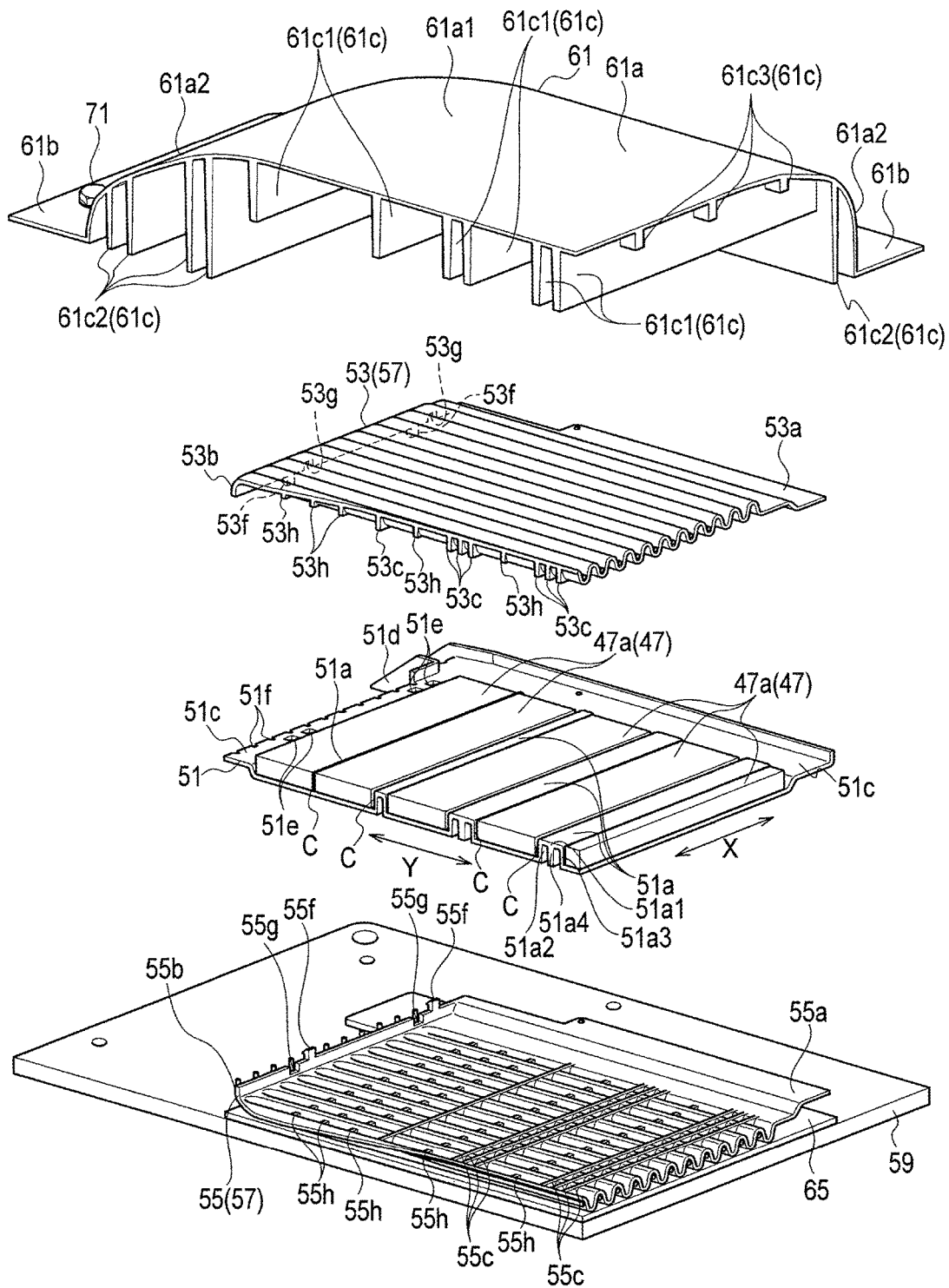

FIG. 15 is an exploded perspective view of the power-transmission-side coil unit in FIG. 14.

Figure 16:
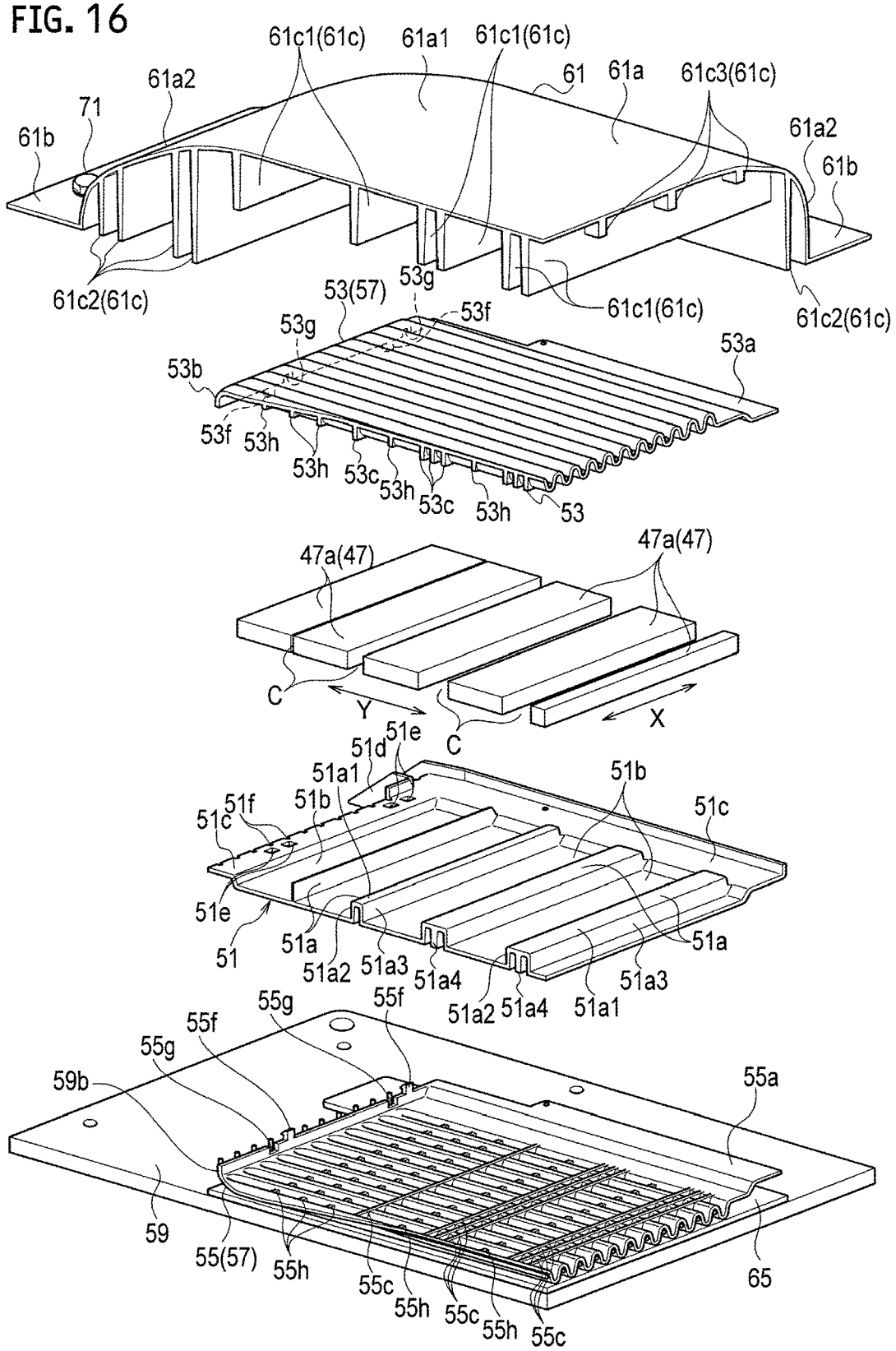

FIG. 16 is an exploded perspective view in which magnetic cores and a core base in FIG. 15 are further separated from each other.

Figure 17:
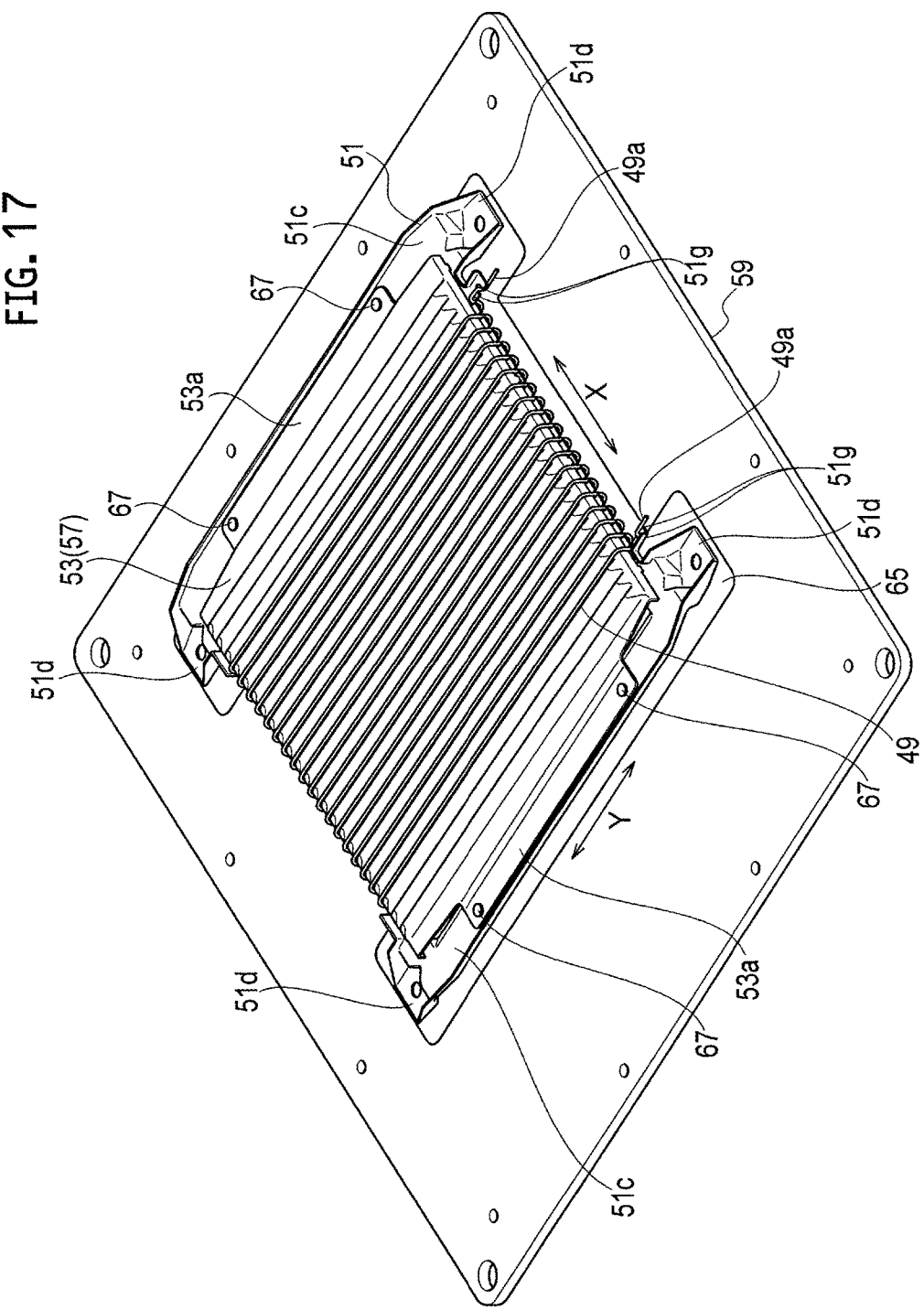

FIG. 17 is a perspective view of the power-transmission-side coil unit without a resin cover in FIG. 14.

Figure 18:
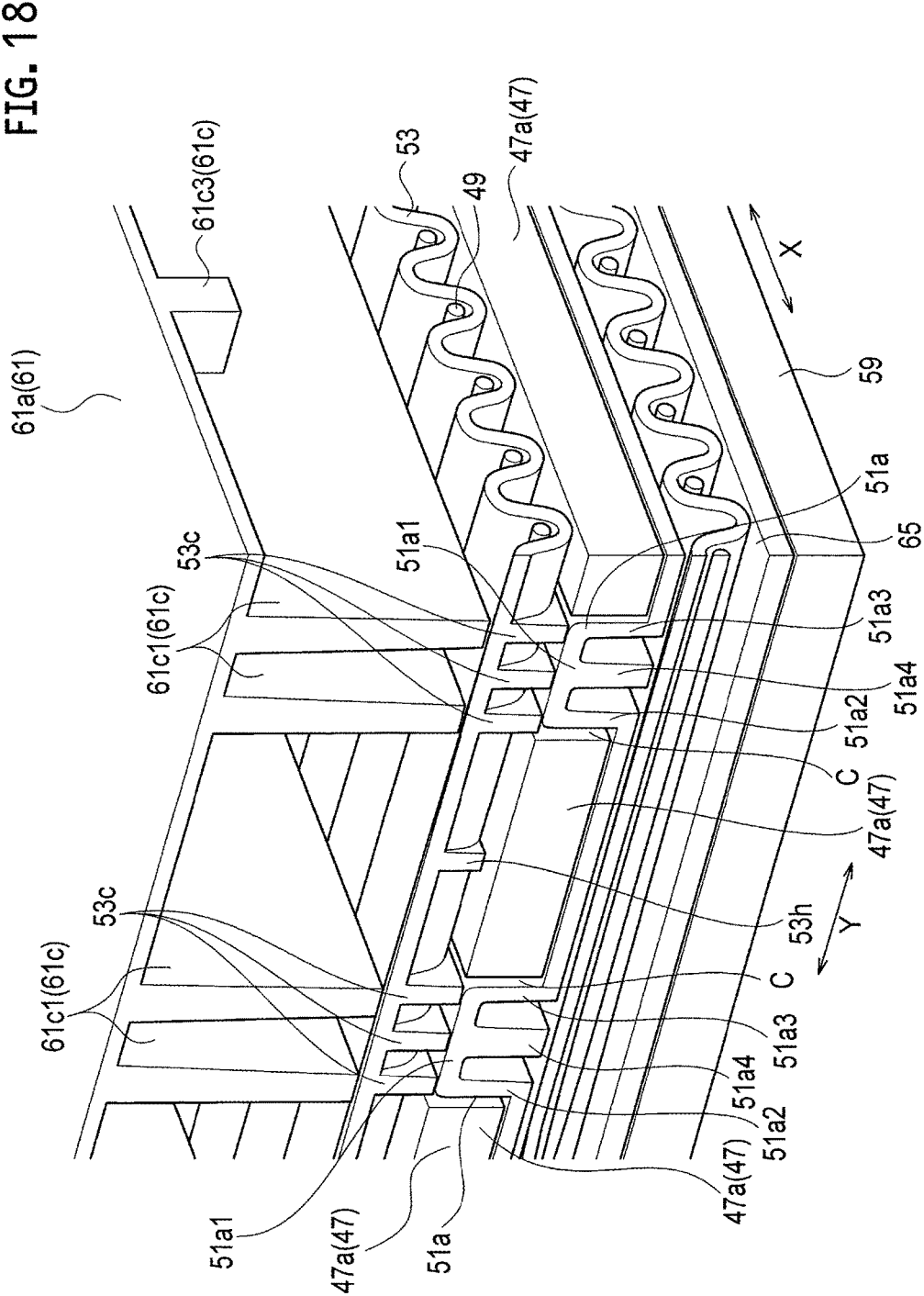

FIG. 18 is an enlarged perspective view of a main part in FIG. 14.

Figure 19:
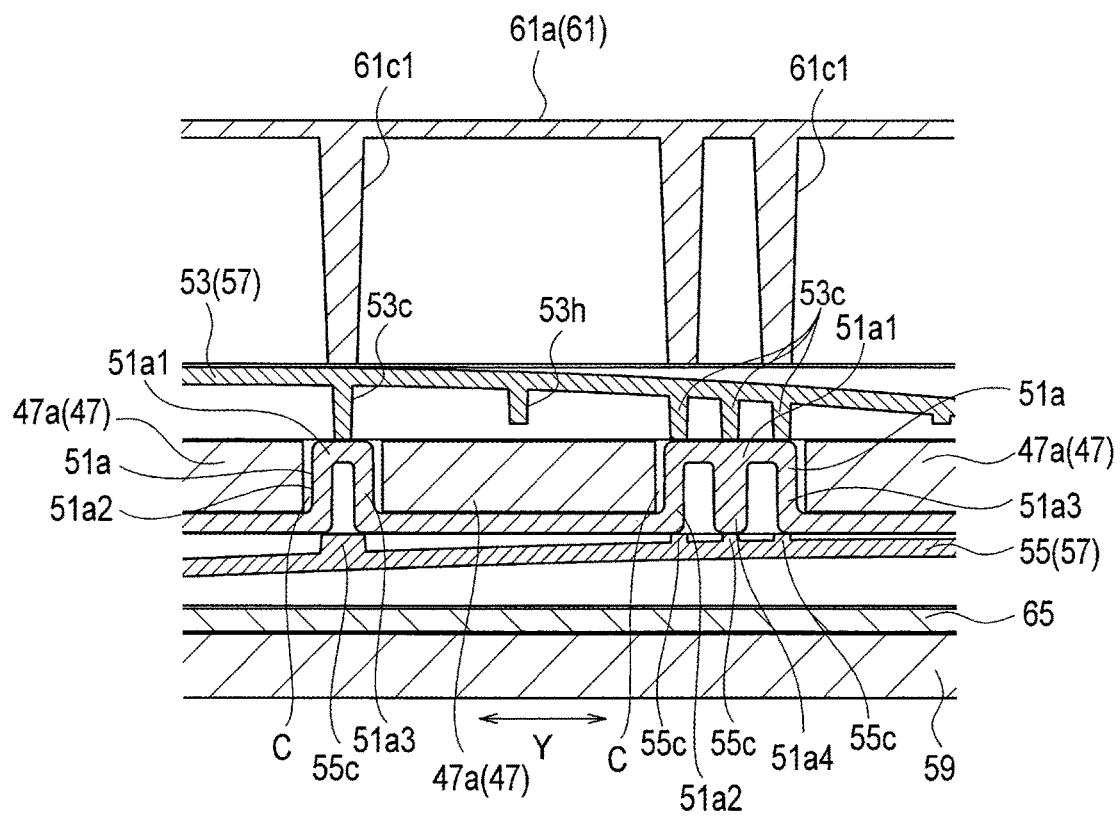

FIG. 19 is a cross-sectional view corresponding to FIG. 18.

Part (a) of FIG. 20 is a perspective view of the core base shown in FIG. 16, and Part (b) of FIG. 20 is a perspective view of the core base in Part (a) of FIG. 20 with split magnetic cores arranged thereon.

Part (a) of FIG. 21 is a perspective view of a core base with identical clearances between the split magnetic cores, and Part (b) of FIG. 21 is a perspective view of the core base in Part (a) of FIG. 21 with split magnetic cores arranged thereon.

Figure 22:
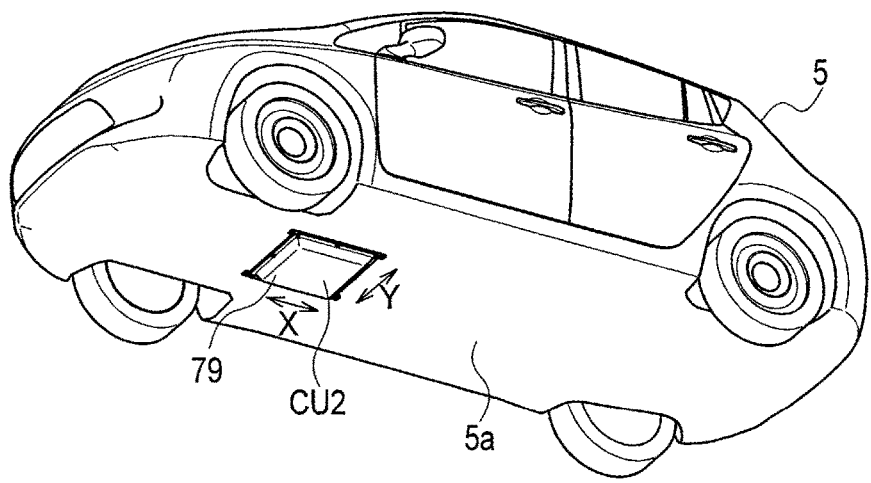

FIG. 22 is a perspective view showing a state where a power-reception-side coil unit is attached to the bottom of a vehicle.

Figure 23:
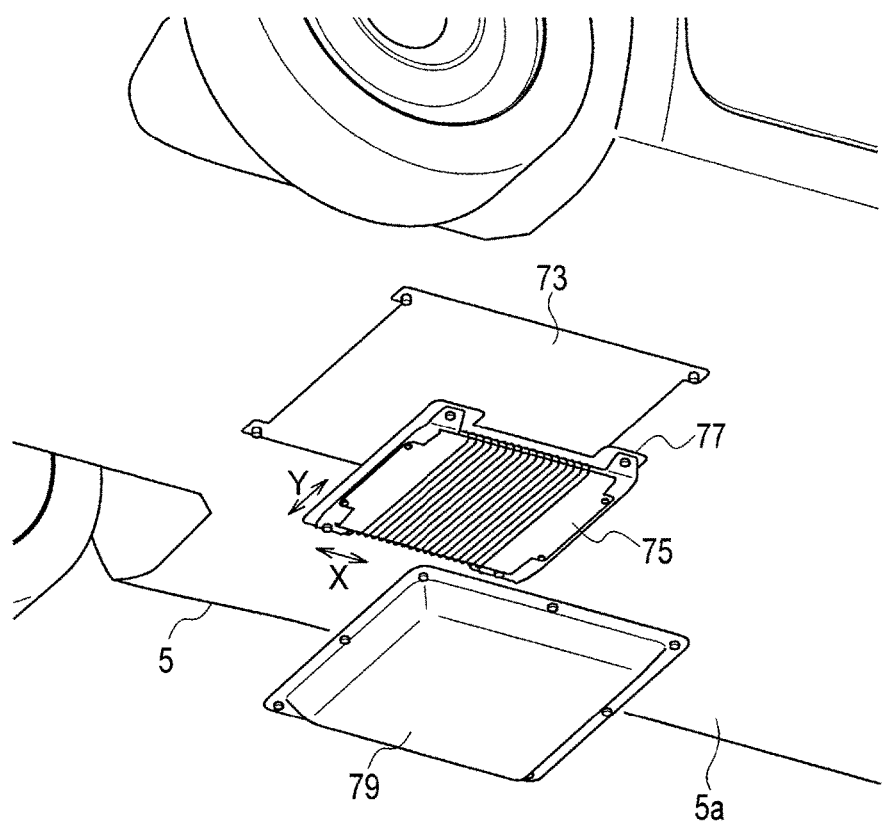

FIG. 23 is an exploded perspective view of the power-reception-side coil unit in FIG. 22.

Figure 24:
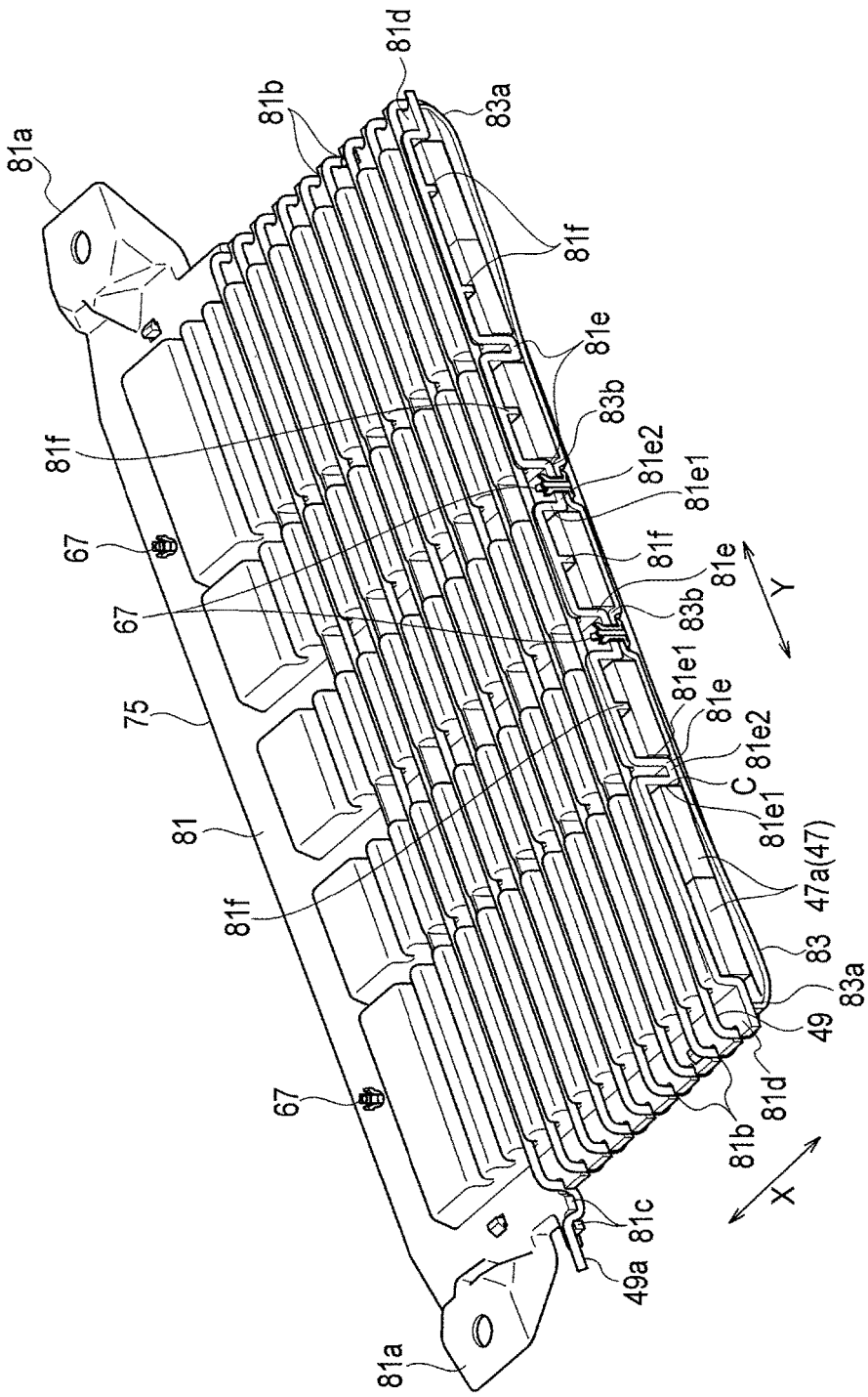

FIG. 24 is a perspective view showing part of a coil bobbin used in the power-reception-side coil unit in FIG. 22.

Figure 25:
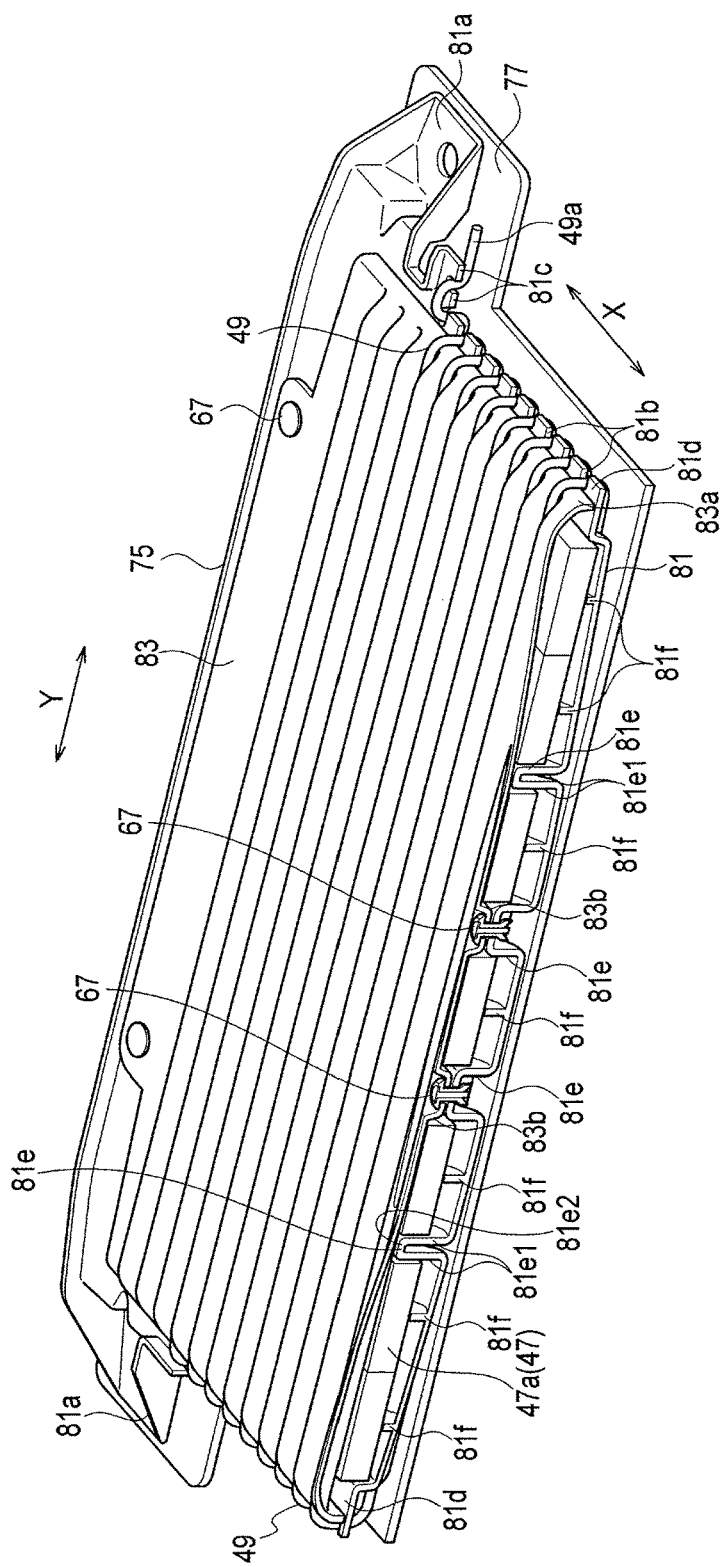

FIG. 25 is a perspective view of the part of the coil bobbin used in the power-reception-side coil unit in FIG. 22 as seen from the opposite side from FIG. 24.

Figure 26:
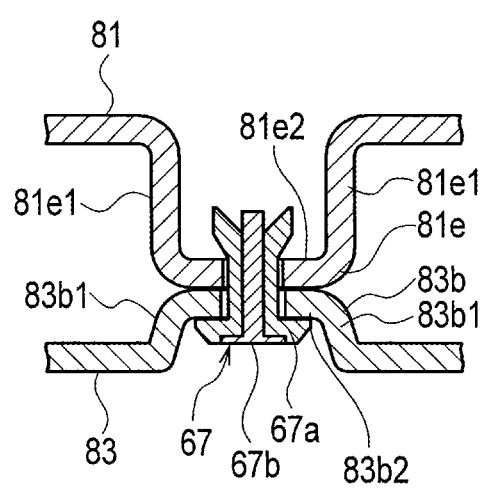

FIG. 26 is a cross-sectional view showing a structure for fastening an upper bobbin and a lower bobbin of the coil bobbin in FIG. 24.

DESCRIPTION OF EMBODIMENTS

A mode for carrying out the present invention will be described below in detail with reference to the drawings.

Figure 1:
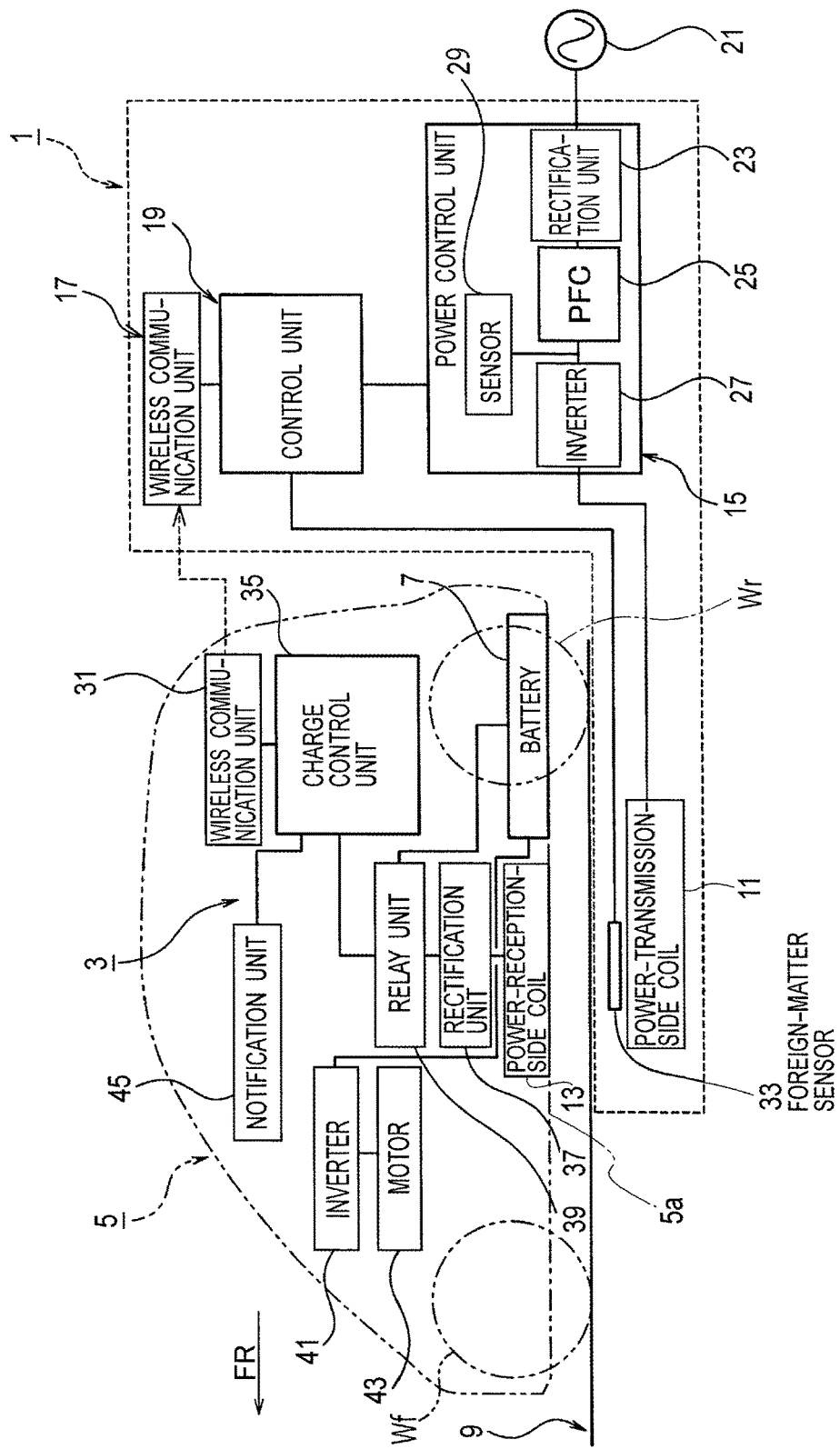
FIG. 1 is an overall configuration diagram of a wireless power supply device including a wireless power supply coil according to an embodiment of the present invention.

A wireless power supply device including a wireless power supply coil in this embodiment shown in FIG. 1 includes a power transmission device 1, which is a ground-side unit, and a power reception device 3, which is a vehicle-side unit. This wireless power supply device is configured to charge a battery 7 mounted on a vehicle 5, which is representatively an electric car or a hybrid car, by wirelessly supplying power from the power transmission device 1, installed at a power transmission station not shown or the like, to the power reception device 3, mounted on the vehicle 5. The power transmission device 1 is constructed as a wireless power transmission device while the power reception device 3 is constructed as a wireless power reception device. Note that in FIG. 1, reference sign Wf denotes a front wheel and reference sign Wr denotes a rear wheel, and the direction indicated by arrow FR is the front side of the vehicle.

The power transmission device 1 includes a power-transmission-side coil 11 that serves as a power transmitter arranged at a parking space 9 near the power transmission station on the ground. On the other hand, the power reception device 3 includes a power-reception-side coil 13 that serves as a power receiver provided at a bottom 5a of the vehicle 5 in such a way as to face the power-transmission-side coil 11 when the vehicle 5 is stopped at a predetermined position in the parking space 9. Each of the power-transmission-side coil 11 and the power-reception-side coil 13 is mainly formed of a coil made of a conductive wire. Power can be wirelessly supplied from the power-transmission-side coil 11 to the power-reception-side coil 13 by electromagnetic induction effect between the power-transmission-side coil 11 and the power-reception-side coil 13.

The power transmission device 1 on the ground side includes a power control unit 15, the above-mentioned power-transmission-side coil 11, a wireless communication unit 17, and a control unit 19. The power control unit 15 is a circuit configured to convert AC power transmitted from an AC power source 21 into high-frequency AC power and transmit it to the power-transmission-side coil 11, and includes a rectification unit 23, a PFC circuit 25, an inverter 27, and a sensor 29.

The rectification unit 23 is a circuit electrically connected to the AC power source 21 and configured to rectify the AC power outputted from the AC power source 21. The PFC circuit 25 is a circuit configured to improve power factor by changing the waveform outputted from the rectification unit 23 into a favorable waveform (Power Factor Correction), and is connected between the rectification unit 23 and the inverter 27. The wireless communication unit 17 is configured to perform bidirectional communication with a wireless communication unit 31 provided to the vehicle 5 side.

The control unit 19 is a part configured to control the whole power transmission device 1. Through communication between the wireless communication units 17, 31, the control unit 19 transmits to the vehicle 5 side a signal indicating start of supply of power from the power transmission device 1, and receives from the vehicle 5 side a signal requesting supply of power from the power transmission device 1. Besides the above, the control unit 19 controls the switching of the inverter 27 based on current detected by the sensor 29 and controls the power to be transmitted from the power-transmission-side coil 11. Moreover, during power transmission, the control unit 19 stops the power transmission or transmits a warning signal to the vehicle 5 side through the wireless communication units 17, 31 based on a detection signal from the foreign-matter sensor 33.

As the foreign-matter sensor 33, a metal detection coil is used, for example. The foreign-matter sensor 33 is configured to detect a metallic foreign matter when the foreign matter enters or is present in a magnetic field formed between the power-transmission-side coil 11 and the power-reception-side coil 13 during power transmission. Upon detection, with an electric detection signal from the foreign-matter sensor 33, the control unit 19 immediately issues a warning or prompts stop of the power transmission to prevent the occurrence of troubles attributable to the presence of the metallic foreign matter in the magnetic field such as power transmission failure.

The power reception device 3 on the vehicle 5 side includes the above-mentioned battery 7, power-reception-side coil 13, and wireless communication unit 31, as well as a charge control unit 35, a rectification unit 37, a relay unit 39, an inverter 41, a motor 43, and a notification unit 45. When the vehicle 5 is parked at a predetermined stop position in the parking space 9, the power-reception-side coil 13 is situated at such a position as to face the power-transmission-side coil 11 from immediately above with a given distance to the power-transmission-side coil 11.

The rectification unit 37 is constructed as a rectification circuit connected to the power-reception-side coil 13 and configured to rectify the AC power received by the power-reception-side coil 13 into DC power. The relay unit 39 includes a relay switch configured to be switched on and off under control of the charge control unit 35. Moreover, by switching off the relay switch, the relay unit 39 separates a main circuit system, which includes the battery 7, and the power-reception-side coil 13 and the rectification unit 37, which serve as a charge circuit section, from each other.

The battery 7 is formed by connecting a plurality of secondary batteries and serves as a power source for the vehicle 5. The inverter 41 is a control circuit such as a PWM control circuit including switching elements such as IGBTs, and is configured to convert DC power outputted from the battery 7 into AC power based on switching control signals and supply the AC power to the motor 43. The motor 43 is constructed as a three-phase AC motor, for example, and serves as a drive source for driving the vehicle 5. The notification unit 45 is constructed as an alarm lamp, the display of a navigation system, a speaker, or the like, and is configured to output light, an image, a sound, or the like to the user based on control of the charge control unit 35.

The charge control unit 35 is a controller for controlling the charge of the battery 7, and is configured to control components such as the wireless communication unit 31, the notification unit 45, and the relay unit 39. The charge control unit 35 transmits a signal indicating start of charge to the control unit 19 through communication between the wireless communication units 31, 17. Moreover, the charge control unit 35 is connected to a controller not shown configured to control the whole vehicle 5 through a CAN communication network. This controller controls the switching of the inverter 41 and manages the state of charge (SOC) of the battery 7. When the battery 7 is fully charged based on the state of charge thereof managed by the controller, the charge control unit 35 transmits to the control unit 19 a signal requesting termination of the charge.

The wireless power supply device in this embodiment wirelessly transmits and receives high-frequency power between the power-transmission-side coil 11 and the power-reception-side coil 13 through electromagnetic induction effect. Specifically, upon application of voltage to the power-transmission-side coil 11, the power-transmission-side coil 11 and the power-reception-side coil 13 are magnetically coupled to each other, so that power is supplied from the power-transmission-side coil 11 to the power-reception-side coil 13.

Figure 2:
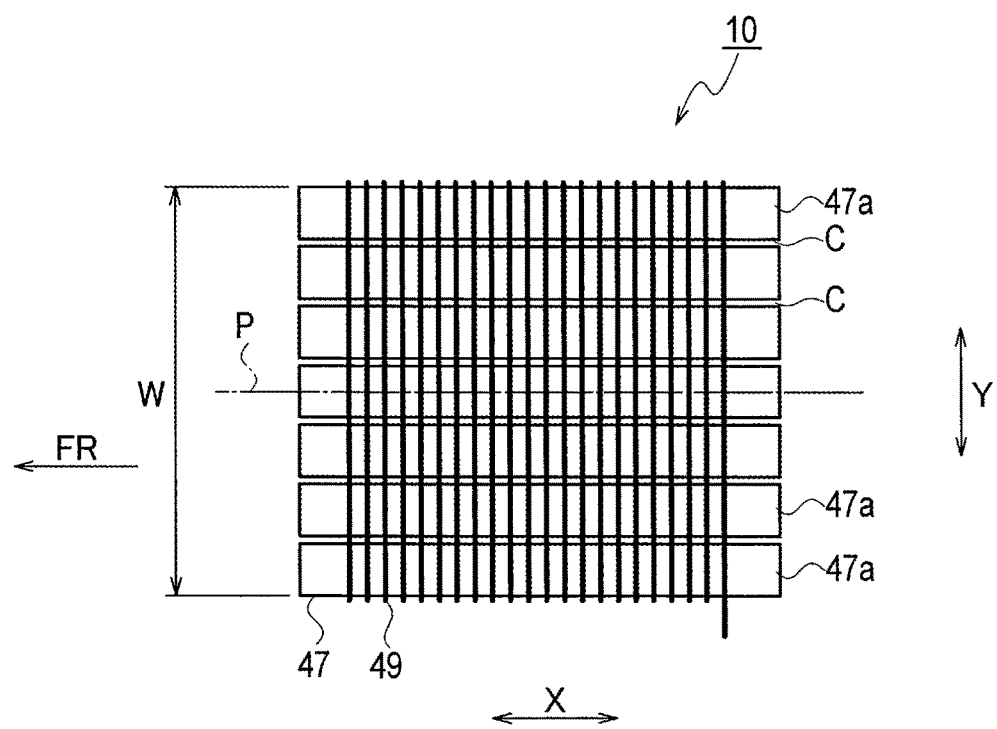
FIG. 2 is a simplified plan view of the wireless power supply coil.

Each of the power-transmission-side coil 11 and the power-reception-side coil 13 is a solenoid coil and, as shown in a simplified plan view in FIG. 2, includes a magnetic core 47 as a magnetic body and a coil wire 49 as a conductive wire annularly wound around the magnetic core 47. That is, each of the power-transmission-side coil 11 and the power-reception-side coil 13 includes a coil wire 49 wound annularly and a magnetic core 47 arranged inside the annular coil wire 49. The magnetic core 47 is made of ferrite, for example.

In this embodiment, the power-transmission-side coil 11 and the power-reception-side coil 13 will be described below as a wireless power supply coil 10. Here, the wireless power supply coil 10 shown in FIG. 2 is arranged such that a coil axis P corresponding to the center axis of the annular part of the annularly wound coil wire 49 is along the vehicle front-rear direction in FIG. 1. Specifically, in FIG. 2, the direction in which the coil axis P extends corresponds to the vehicle front-rear direction, and the direction perpendicular to the plane of the sheet of FIG. 2 corresponds to the vehicle up-down direction.

The magnetic core 47 of this wireless power supply coil 10 is split along the vehicle width direction, which corresponds to the up-down direction in FIG. 2, into a plurality of parts (seven parts in FIG. 2), and includes a plurality of split magnetic cores 47a. Specifically, in this embodiment, the magnetic core 47 is split along a coil-axis intersecting direction Y into a plurality of split magnetic cores 47a, the coil-axis intersecting direction Y intersecting a coil axis direction X of the coil, with the coil wire 49 wound around the magnetic core 47. The intersection of the coil axis direction X and the coil-axis intersecting direction Y includes a case where the coil axis direction X and the coil-axis intersecting direction Y intersect each other perpendicularly.

Moreover, between the plurality of split magnetic cores 47a, a clearance C is provided as a magnetic clearance extending continuously along the coil axis direction X. In this example, the plurality of split magnetic cores 47a are identical to each other in shape and are formed of flat plate-shaped members extending in parallel to the coil axis direction X. Moreover, the plurality of clearances C are also identical to each other in width in the coil-axis intersecting direction Y and are identical to each other in shape and formed in a straight shape parallel to the coil axis direction X.

Since the clearances C are provided, the wireless power supply coil 10 can be accordingly lighter in weight than a wireless power supply coil 10 including a single magnetic core with no clearance provided therein (not split into a plurality of split magnetic bodies) on condition that a width W of the magnetic core 47 in the coil-axis intersecting direction Y is the same. To put it differently, the width W is made large to increase the amount of tolerance for offset between the power-transmission-side coil 11 and the power-reception-side coil 13 in the vehicle width direction in order to make alignment between the power transmission and reception coils 11, 13 in FIG. 1 easier, but weight reduction can still be achieved by providing the clearances C.

In wireless power supply, the total amount of magnetic flux formed between a primary coil and a secondary coil is less than that of a transformer since the air gap between the two coils acts as a magnetic resistance. Here, a magnetic flux that flows inside a magnetic body is directed in the coil axis direction X; however, in the case of the wireless power supply, in which the total amount of magnetic flux is originally small, providing the clearances C, extending along the coil axis direction X as in FIG. 2, somewhat reduces the magnetic path but does not greatly influence the performance (self-inductance L and coupling coefficient k).

In a comparative example where, as opposed to this embodiment, a magnetic body is split along the coil axis direction X into a plurality of split magnetic bodies with a clearance extending therebetween along the coil-axis intersecting direction Y, the clearance is present in the direction (magnetic path) in which a concentrated magnetic flux flows. In this case, the clearance acts as an air gap and increases the magnetic resistance, thereby making it harder for the magnetic flux to flow and causing a large loss for the coil. Note that the relative permeability of an air gap is less than about $1/2000$ of that of ferrite, and the magnetic resistance of an air gap is significantly greater than ferrite. Also, as in the above comparative example, when the shape of a magnetic body is shorter in length in the direction of flow of magnetic flux than that in this embodiment, the demagnetizing field generated in the magnetic body increases as well. As the magnetic body becomes shorter in the direction of flow of magnetic flux, the demagnetizing field increases and becomes a factor of increase in magnetic resistance.

For this reason, it is effective to split the magnetic core 47 along the coil-axis intersecting direction Y into a plurality of split magnetic cores 47a and provide a clearance C, extending along the coil axis direction X, between the plurality of split magnetic cores 47a, as in this embodiment. Specifically, by providing the clearances C, extending along the coil axis direction X, in the magnetic core 47, it is possible to ensure sufficient self-inductance L and coupling coefficient k and also ensure weight reduction and a sufficient outer diameter for the magnetic core 47, which makes it possible to achieve easier alignment between the power-transmission-side coil 11 and the power-reception-side coil 13.

Figure 4:
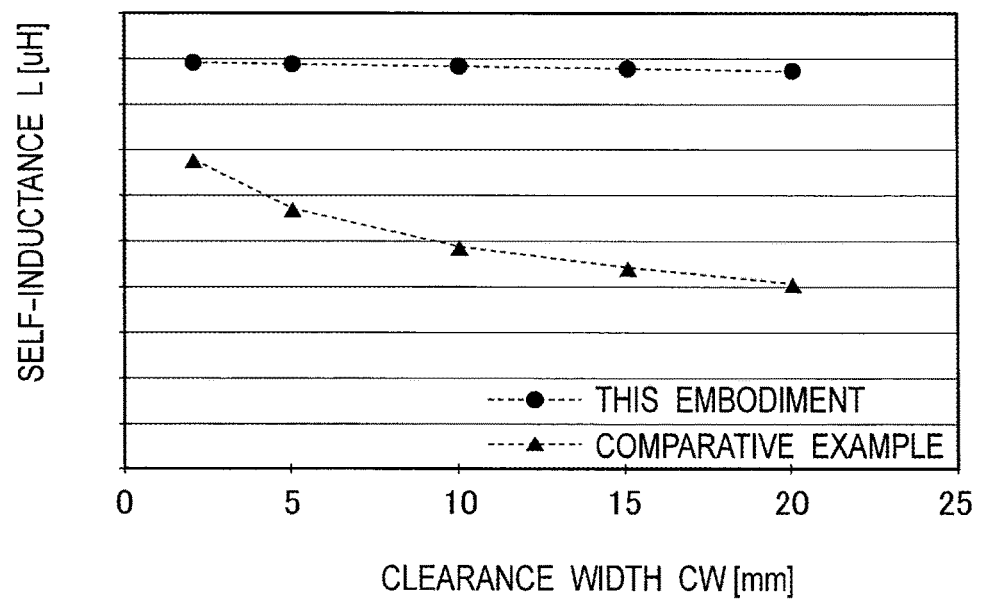
FIG. 4 is a correlation chart between the width of a clearance and the self-inductance of the coil in each of the embodiment (a) and the comparative example (b).

FIG. 3 shows this embodiment (a) and the comparative example (b) in a simplified fashion with two split magnetic cores 47a. FIG. 4 shows the correlation between a width CW of the clearance C and the self-inductance L of the coil in each of this embodiment (a) and the comparative example (b). The clearance C is formed along the coil axis direction X in this embodiment (a), whereas the clearance C is formed along the coil-axis intersecting direction Y in the comparative example (b).

According to FIG. 4, in the comparative example (b), the self-inductance L decreases with increase in the width CW of the clearance C. However, in this embodiment (a), the self-inductance L does not greatly decrease but remains substantially constant with increase in the width CW of the clearances C.

Figure 5:
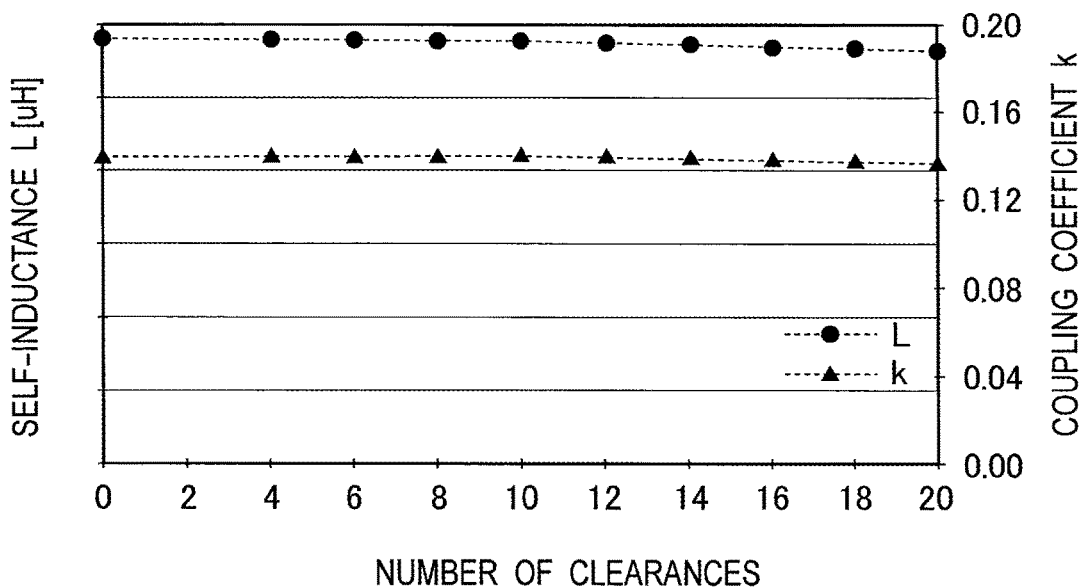
FIG. 5 is a correlation chart between the number of clearances and the self-inductance and coupling coefficient of the coil in the embodiment.

FIG. 5 shows the correlations between the number of clearances C and the self-inductance L and coupling coefficient k in this embodiment. In FIG. 5, in which the number of clearances C shown is 0 (no clearance) to 20, both the self-inductance L and the coupling coefficient k do not greatly decrease but remain substantially constant with increase in number of clearances C, and are not greatly lower than but substantially equal to those in the case with no clearance. Thus, even when, for example, six clearances C are provided between seven split magnetic cores 47a as in FIG. 2, the self-inductance L and the coupling coefficient k are not influenced, and the performance of the coil can be maintained.

Also, in this embodiment, the clearances C have a straight shape parallel to the coil axis direction X. In this way, less air gaps are present in the direction of flow of magnetic flux and the magnetic resistance is thus lower than when the clearances C are, for example, curved along the coil axis direction X. Also, forming the clearances C in parallel to the coil axis direction X makes the shape of the split magnetic cores 47a straight. This enhances the formability of the split magnetic cores 47a, which are made of ceramic or the like, when they are manufactured. Hence, the yield of the product can be improved as well.

FIG. 6 and FIG. 7 show some examples where the plurality of split magnetic cores 47a are seven split magnetic cores. Part (a) of FIG. 6 is an example corresponding to FIG. 2, in which the split magnetic cores 47a are identical in width in the coil-axis intersecting direction Y and the clearances C are identical in width CW as well. In this case, the plurality of split magnetic cores 47a are also identical in thickness in the direction perpendicular to each of the coil axis direction X and the coil-axis intersecting direction Y and are identical to each other in shape. The manufacturing cost can be reduced by making a plurality of split magnetic cores 47a of an identical shape.

In the example of Part (a) of FIG. 6, magnetic flux density (average magnetic flux density) B is higher toward the outer sides from the center in the coil-axis intersecting direction Y, as shown in Part (a) of FIG. 8, due to the influence of the end effect. In particular, the magnetic flux density B at the first and seventh split magnetic cores 47a, which are situated outermost, is remarkably higher. When the magnetic flux density B is high, the heat generation density is also high, as shown in Part (a) of FIG. 10, which increases loss of the coil. The examples of Part (b) of FIG. 6 and Parts (a) and (b) of FIG. 7 cope with this magnetic flux density distribution by making it more uniform. In the examples of Part (b) of FIG. 6 and Parts (a) and (b) of FIG. 7, the magnetic flux density B as a whole is made uniform by increasing the magnetic paths on the outer sides in the coil-axis intersecting direction Y.

Part (b) of FIG. 6 is an example where the widths of the plurality of split magnetic cores 47a in the coil-axis intersecting direction Y are equal (their thicknesses are equal as well), but the widths CW of the gaps C (hereinafter, simply referred to as "the sizes of the clearances C" as well) closer to the outer sides in the coil-axis intersecting direction Y are smaller than the widths CW of the gaps C closer to the center in the coil-axis intersecting direction Y. Specifically, the pair of (two) clearances C by the sides of the fourth split magnetic core 47a, situated at the center, are the largest, and the clearances C toward the outer sides therefrom become smaller and smaller. Note that the pair of (two) clearances C by the sides of the fourth center split magnetic core 47a may be the largest, and the four clearances C, which are smaller than and situated outward of the two clearances C, may be formed in an equal size.

As opposed to Part (b) of FIG. 6, Part (a) of FIG. 7 is an example where the widths CW of the plurality of clearances C are equal but, the widths, in the coil-axis intersecting direction Y, those of the plurality of split magnetic cores 47a on the outer sides in the coil-axis intersecting direction Y are larger than the widths of those closer to the center in the coil-axis intersecting direction Y. In this example, the widths, in the coil-axis intersecting direction Y, of the pair of (two) first and seventh split magnetic cores 47a, situated outermost in the coil-axis intersecting direction Y, are greater than the widths of the other five split magnetic cores 47a in the same direction. The widths of the other five split magnetic cores 47a in the coil-axis intersecting direction Y are equal.

Part (b) of FIG. 7 is an example combining Part (b) of FIG. 6 and Part (a) of FIG. 7. That is, the sizes of those of the plurality of clearances C closer to the outer sides in the coil-axis intersecting direction Y are smaller than the sizes of those closer to the center in the coil-axis intersecting direction Y, and the widths, in the coil-axis intersecting direction Y, of those of the plurality of split magnetic cores 47a on the outer sides in the coil-axis intersecting direction Y are larger than the widths of those closer to the center in the coil-axis intersecting direction Y. Specifically, as in Part (b) of FIG. 6, the pair of (two) clearances C by the sides of the fourth split magnetic core 47a, situated at the center, are the largest, and the clearances C toward the outer sides therefrom become smaller and smaller. Further, as in Part (a) of FIG. 7, the widths, in the coil-axis intersecting direction Y, of the pair of (two) first and seventh split magnetic cores 47a, situated outermost in the coil-axis intersecting direction Y, are larger than the widths of the other five split magnetic cores 47a in the same direction.

By increasing the magnetic paths on the outer sides in the coil-axis intersecting direction Y as in the examples of Part (b) of FIG. 6 and Parts (a) and (b) of FIG. 7, the magnetic flux density B becomes as shown in Part (b) of FIG. 8 and Parts (a) and (b) of FIG. 9, respectively. That is, in the examples of Part (b) of FIG. 6 and Parts (a) and (b) of FIG. 7, the magnetic flux density B decreases particularly at the outermost first and seventh split magnetic cores 47a but increases at the center-side third to fifth split magnetic cores 47a and is uniform as a whole as compared to Part (a) of FIG. 8.

As shown in each of Part (b) of FIG. 10 and Parts (a) and (b) of FIG. 11, in response to such changes in the magnetic flux density B, the heat generation density becomes uniform as compared to Part (a) of FIG. 10.

As described above, the magnetic flux density B is higher at outer sections than at a center section in the coil-axis intersecting direction Y. For this reason, the split magnetic cores 47a at the outer sections with higher magnetic flux density B are made larger in width and the clearances C therebetween are made smaller than those at the center section. By doing so, the magnetic paths increase. Accordingly, the self-inductance L and the coupling coefficient k can be maintained high.

Note that, instead of the widths, the thicknesses of the split magnetic cores 47a at the outer sections with higher magnetic flux density B may be made larger than those at the center section. That is, of the plurality of split magnetic cores 47a, the split magnetic cores 47a on the outer sides in the coil-axis intersecting direction Y may be larger in thickness in the direction perpendicular to each of the coil axis direction X and the coil-axis intersecting direction Y than the split magnetic cores 47a closer to the center in the coil-axis intersecting direction Y.

Increasing the widths or thicknesses of a split magnetic core 47a means increasing the projected area of the split magnetic core 47a in the coil axis direction X, i.e., the area through which a magnetic flux flows. In other words, it means increasing the cross-sectional area in a plane including the coil-axis intersecting direction Y and the top-bottom direction (the direction perpendicular to each of X and Y). FIG. 12 is a set of cross-sectional views showing the above-mentioned projected areas corresponding respectively to Parts (a) and (b) of FIG. 6, Parts (a) and (b) of FIG. 7, and the case where the thicknesses are increased. Note that the number of split magnetic cores 47a is five.

A total area S of the split magnetic cores 47a is equal among the Parts (a) and (b) of FIG. 6, Parts (a) and (b) of FIG. 7, and the case where the thicknesses are increased. This total area S is determined by the following formula, where L is the inductance value, I is the current value, N is the number of windings, and B is the magnetic flux density. Here, L, I, and N are determined by the coil design and are therefore constant, while the magnetic flux density B is equal to or less than 170 mT.

$$S = L \times I / (N \times B)$$

The correlation between the number of clearances C (the number of split magnetic cores 47a) and a total magnetic flux $\varphi$ (=B×S) is such that, when the number of clearances C is increased (the widths CW of the clearances C are constant) and the total area S is reduced, the magnetic flux density at each split magnetic core 47a becomes high, which leads to increase in loss. Then, by making the total clearance equal to or less than a certain value (making the total area S equal to or greater than a certain value), a sufficient total magnetic flux $\varphi$ can be ensured. Making the total area S equal to or greater than the certain value also includes making the volume equal to or greater than a certain value. That is, of the plurality of split magnetic cores 47a, the split magnetic cores 47a on the outer sides in the coil-axis intersecting direction Y may be larger in volume than the split magnetic core 47a closer to the center in the coil-axis intersecting direction Y.

Meanwhile, in the above-described embodiment, the clearances C have a straight shape parallel to the coil axis direction X. However, the clearances C may have a straight shape not parallel to but slightly inclined relative to the coil axis direction X. Alternatively, the clearances C may not have a straight shape but have a curved, wavy, or zigzag shape along the coil axis direction X.

Moreover, in the above-described embodiment, each split magnetic core 47a has an elongated shape along the coil axis direction X, as shown in FIG. 2 and FIG. 6. However, the split magnetic core 47a in this elongated shape may be split along the coil axis direction X into a plurality of parts and formed in a block shape that is square or rectangular in a plan view from the vehicle up-down direction. In this case, the unit blocks are arranged side by side along the coil axis direction X such that adjacent blocks are in tight contact with each other with no clearance left therebetween. Note that there are cases where a small clearance is provided between the unit blocks in consideration of vibration, thermal contraction, and the like. In these cases, the unit blocks are arranged sufficiently close to each other. Doing so suppresses increase in magnetic resistance, and the small clearance does therefore not act as a "magnetic clearance" with a large magnetic resistance.

By forming each split magnetic core 47a into a block shape, the unit blocks of an identical shape can be arranged in accordance with the size and shape of the wireless power supply coil. This makes it possible to use a magnetic core that is more versatile and less expensive than long magnetic cores, and thus to reduce the component cost.

As mentioned earlier, the magnetic core 47 of the wireless power supply coil 10 is split along the coil-axis intersecting direction Y into a plurality of split magnetic cores 47a, the coil-axis intersecting direction Y intersecting the coil axis direction X of the coil, with the coil wire 49 wound around the magnetic core 47. Moreover, between the plurality of split magnetic cores 47a, a clearance C is provided as a magnetic clearance extending along the coil axis direction X.

In the case where a coil unit housing the magnetic core 47 in a coil case, for example, is installed on the ground or mounted on a vehicle as in FIG. 1, its strength and rigidity need to be taken into greater consideration when the above clearances C are provided in the magnetic core 47 than when the clearances C are not provided. Description will now be given of a specific structure example that takes the strength and rigidity of the coil unit into greater consideration.

FIG. 13 to FIG. 17 show a power-transmission-side coil unit CU1 with the power-transmission-side coil 11, installed on the ground as the wireless power supply coil 10. Note that FIG. 13 to FIG. 17 show the coil axis direction X and the coil-axis intersecting direction Y in the opposite way from FIG. 6. Also, the coil unit CU1 in FIG. 13 to FIG. 17 corresponds to the example in Part (b) FIG. 6, in which the widths of the split magnetic cores 47a are equal and the widths CW of the clearances C closer to the outer sides are smaller.

The magnetic core 47, including the plurality of split magnetic cores 47a, is arranged on a flat plate-shaped core base 51 shown in FIG. 14 to FIG. 16 with the clearances C provided, and is housed in a coil bobbin 57 including an upper bobbin 53 and a lower bobbin 55. The upper bobbin 53, the lower bobbin 55, and the core base 51 are made of glass-fiber reinforced plastic (GFRP) containing glass-fiber non-woven fabric as its base material. The coil wire 49 is wound around the outer side of the coil bobbin 57. Further, the coil bobbin 57 is housed in a housing 63 including for example a metallic bottom plate 59 and a resin cover 61. Also, an insulation plate 65 is arranged between the lower bobbin 55 and the bottom plate 59. The upper bobbin 53 and the lower bobbin 55 form an upper wall and a lower wall, respectively, and the coil bobbin 57 forms a case.

Next, each member in the power-transmission-side coil unit CU1 will be described in detail. As shown in FIG. 16, the core base 51 is provided with protrusions 51a as reinforcement portions protruding toward the upper bobbin 53 at positions corresponding to the clearances C. The protrusions 51a have widths in the coil-axis intersecting direction Y corresponding to the widths CW of the clearances C and extend in the coil axis direction X in such a way as to fill the clearances C. The lengths of the protrusions 51a in the coil axis direction X are equal to the lengths of the split magnetic cores 47a in the same direction. Note that Part (a) of FIG. 20 shows the whole core base 51, and Part (b) of FIG. 20 shows a state where the split magnetic cores 47a are arranged on the core base 51 in Part (a) of FIG. 20.

Each of the protrusions 51a at the two center positions corresponding to the clearances C with the largest width CW includes an upper wall 51a1, two side walls 51a2, 51a3, and a center wall 51a4 extending downward between the side walls 51a2, 51a3 from the upper wall 51a1. Each of the two protrusions 51a situated outward of these protrusions 51a at the two center positions includes an upper wall 51a1 and two side walls 51a2, 51a3. Each of the two protrusions 51a situated further outward, corresponding to the narrowest clearances C, is formed in the shape of a single plate.

The upper end surface of each protrusion 51a, such as the upper surface of the upper wall 51a1, is substantially flush with the upper end surfaces of the split magnetic cores 47a, as shown in FIG. 15 and Part (b) of FIG. 20. Also, the lower ends of the center walls 51a4 of the protrusions 51a at the two center positions, corresponding to the clearances C with the largest width CW, are substantially flush with the lower surface of a bottom 51b of the core base 51.

The core base 51 includes a peripheral flange portion 51c as its outer edge around the four peripheral sides bent upward from the bottom 51b, which the split magnetic cores 47a are to be placed on and fixed to. This peripheral flange portion 51c is clamped and fixed by peripheral portions of the upper bobbin 53 and the lower bobbin 55, as shown in FIG. 14.

Each of the upper bobbin 53 and the lower bobbin 55 has a corrugated plate shape in which recesses and protrusions appear repeatedly along the coil axis direction X. The upper bobbin 53 and the lower bobbin 55 include flanges 53a, 55a, respectively, at the two opposite ends, in the coil axis direction X, of the outer edges around the four peripheral sides of the corrugated-plate-shaped portions, the flanges 53a, 55a being bent toward each other and then extended horizontally. These flanges 53a, 55a sandwich the peripheral flange portion 51c of the core base 51 from above and below and, in this state, are fixed at two positions around the opposite ends in the coil-axis intersecting direction Y, as shown in FIG. 17, with fixing members such as clips 67 similar to one shown in FIG. 26, for example.

The upper and lower bobbins 53, 55 include curved end portions 53b, 55b, respectively, at the two opposite ends, in the coil-axis intersecting direction Y, of the outer edges around the four peripheral sides of the corrugated-plate-shaped portions, the curved end portions 53b, 55b being curved toward each other and clamping the peripheral flange portion 51c of the core base 51 from above and below. As shown in FIG. 17, the core base 51 includes attachment leg portions 51d at the four corners on its periphery, and is fixed to the top of the insulation plate 65 by utilizing the attachment leg portions 51d.

Also, at the tips of the curved end portions 53b, 55b of the upper and lower bobbins 53, 55 in the coil-axis intersecting direction Y, engagement protrusions 53f, 55f are provided which protrude toward the core base 51. On the other hand, in the peripheral flange portion 51c of the core base 51, engagement holes 51e are provided with which the engagement protrusions 53f, 55f engage. Thus, when the upper bobbin 53 and the lower bobbin 55 are placed over the other with the core base 51 therebetween, the engagement protrusions 53f, 55f engage with the engagement holes 51e, so that each of the upper bobbin 53 and the lower bobbin 55 and the core base 51 are coupled to each other. Here, the curved end portions 53b, 55b are provided with relief recesses 53g, 55g, into which to insert the tips of the engagement protrusions 53f, 55f projecting from the engagement holes 51e, respectively.

The recesses (or the protrusions) in the corrugated plate shapes of the upper bobbin 53 and the lower bobbin 55 are provided not in parallel to the coil-axis intersecting direction Y but inclined at a small angle thereto. The coil wire 49 is wound helically by being inserted in these inclined recesses. As shown in FIG. 14, opposite end portions of the core base 51 in the coil-axis intersecting direction Y project outward from the upper bobbin 53 and the lower bobbin 55. As shown in FIG. 15 and FIG. 16, notches 51f in which to insert the coil wire 49 are formed in these projecting end portions. Here, the notches 51f are formed at positions corresponding to the recesses in the corrugated plate shapes of the upper bobbin 53 and the lower bobbin 55.

Upper-bobbin ribs 53c are provided on the inner wall surface of the upper bobbin 53, facing the lower bobbin 55, at positions corresponding to some protrusions 51a of the core base 51, the upper-bobbin ribs 53c protruding downward toward the protrusions 51a. As in the protrusions 51a, the upper-bobbin ribs 53c extend along the coil axis direction X. As shown in FIG. 18, for each of the protrusions 51a corresponding to the largest clearances C, three upper-bobbin ribs 53c are provided for the side walls 51a2, 51a3 and the center wall 51a4, and have their lower ends in contact with the upper surface of the upper wall 51a1.

Each of the upper-bobbin ribs 53c adjacent in the coil-axis intersecting direction Y to the sets of upper-bobbin ribs 53c shown in FIG. 18 has its lower end in contact with the upper surface of the upper wall 51a1 of the corresponding protrusion 51a between its two side walls 51a2, 51a3, as shown in FIG. 14. In the state where the lower ends of the upper-bobbin ribs 53c are in contact with the upper surfaces of the protrusions 51a, the downwardly protruding portions of the corrugated plate shape of the upper bobbin 53 are not in contact with but are separated by a small distance from the upper surfaces of the protrusions 51a and the upper surfaces of the split magnetic cores 47a.

As shown in FIG. 15 and FIG. 16, lower-bobbin ribs 55c are provided on the inner wall surface of the lower bobbin 55, facing the upper bobbin 53, at positions corresponding to some protrusions 51a of the core base 51, the lower-bobbin rib 55c protruding upward toward the protrusions 51a. The lower-bobbin ribs 55c also extend along the coil axis direction X, as in the protrusions 51a. For each of the protrusions 51a corresponding to the largest clearances C, three lower-bobbin ribs 55c are provided, as in the three upper-bobbin ribs 53c. The upper ends of these three lower-bobbin ribs 55c are in contact with the lower ends of the side walls 51a2, 51a3 and the center wall 51a4 of the corresponding protrusion 51a, respectively.

Each of the lower-bobbin ribs 55c adjacent in the coil-axis intersecting direction Y to the above-mentioned sets of three lower-bobbin ribs 55c is formed to have such a width as to be capable of contacting both of the two side walls 51a2, 51a3 of the corresponding protrusion 51a from below. Alternatively, two lower-bobbin ribs 55c may be provided for the side walls 51a2, 51a3. In the state where the lower-bobbin ribs 55c are in contact with the lower surfaces of the protrusions 51a and the lower surface of the bottom 51b, the upwardly protruding portions of the corrugated plate shape of the lower bobbin 55 are not in contact with but are separated by a small distance from the lower surfaces of the protrusions 51a and the lower surface of the bottom 51b.

As shown in FIG. 15, in addition to the above-described upper-bobbin ribs 53c and lower-bobbin ribs 55c, the upper bobbin 53 and the lower bobbin 55 include upper ribs 53h and lower ribs 55h which are shorter in length in the up-down direction than the upper-bobbin ribs 53c and the lower-bobbin ribs 55c, respectively. The tips of the upper ribs 53h are situated inward of the protruding portions of the corrugated plate shape (away from the split magnetic cores 47a) and separated from the split magnetic cores 47a and the plate-shaped protrusions 51a. The tips of the lower ribs 55h are situated inward of the protruding portions of the corrugated plate shape (away from the split magnetic cores 47a) and separated from the lower surface of the bottom 51b of the core base 51.

As shown in FIG. 17, opposite ends 49a of the coil wire 49, wound around the coil bobbin 57, are led out at one end portion of the core base 51 in the coil-axis intersecting direction Y around the opposite ends thereof in the coil axis direction X. As shown also in Part (a) of FIG. 20, a pair of lock protrusions 51g on which to hook the coil wire 49 are provided respectively at positions on the core base 51 around which the opposite ends 49a are led out. The core wire 49, lead out from under the coil bobbin 57, is held by routing the core wire 49 in such a staggered manner that the core wire 49 is routed over one of the pair of lock protrusions 51g and then routed under the other.

The ends 49a of the coil wire 49, led out as described above, are connected to a capacitor not shown installed on the bottom plate 59 inside the resin cover 61 and connected to a connector 69 shown in FIG. 13 provided at one side portion of the resin cover 61. As shown in FIG. 14 and FIG. 15, the resin cover 61 includes a cover part 61a formed in such a way as to cover the coil bobbin 57, and an attachment flange 61b situated around the four peripheral sides of the cover part 61a. The resin cover 61 is fixed to the bottom plate 59 by placing the attachment flange 61b on the upper surface of the periphery of the bottom plate 59 and fastening them with fastening members such as bolts 71.

The cover part 61a includes a flat plate portion 61a1 of a substantially flat plate shape situated at a position corresponding to the coil bobbin 57, and a curved portion 61a2 continuing from the periphery of the flat plate portion 61a1, curved toward the attachment flange 61b, and continuing to the attachment flange 61b. Moreover, on the inner wall surface of the cover part 61a, facing the bottom plate 59, cover ribs 61c are provided which protrude toward the bottom plate 59.

The cover ribs 61c include bobbin contact ribs 61c1 situated on the flat plate portion 61a1 and having their lower ends in contact with the upper bobbin 53, and bottom-plate contact ribs 61c2 situated on the curved portion 61a2 and having their lower ends in contact with the bottom plate 59. The cover ribs 61c further include bobbin separated ribs 61c3 situated mainly on the flat plate portion 61a1 and having their lower ends separated from the upper bobbin 53. The bobbin contact ribs 61c1 and some bottom-plate contact ribs 61c2 extend along the coil axis direction X, while the bobbin separated ribs 61c3 extend along the coil-axis intersecting direction Y between the bobbin contact ribs 61c1. The bottom-plate contact ribs 61c2 formed at end portions in the coil axis direction X extend along the coil-axis intersecting direction Y.

One or two bobbin contact ribs 61c1 are provided at each of positions corresponding to the upper-bobbin ribs 53c of the upper bobbin 53 and at each of positions near the curved end portions 53b of the upper bobbin 53. Among them, two bobbin contact ribs 61c1 are provided for the two side upper-bobbin ribs 53c in each set of three upper-bobbin ribs 53c provided for to the largest clearances C. Also, one bobbin contact rib 61c1 is provided for each of those single upper-bobbin ribs 53c provided for the clearances C adjacent to the largest clearances C. Further, one bobbin contact rib 61c1 is provided at each of positions near the curved end portions 53b of the upper bobbin 53.

The bobbin contact ribs 61c1 situated at the positions corresponding to the upper-bobbin ribs 53c correspond to the upper-bobbin ribs 53c, some protrusions 51a of the core base 51, and the lower-bobbin ribs 55c. Hence, these bobbin contact ribs 61c1, upper-bobbin ribs 53c, protrusions 51a, and lower-bobbin ribs 55c are situated at positions corresponding to some clearances C and are arranged at identical positions along the up-down direction in such a way as to form columns extending along the up-down direction.

Next, assume a case where a vehicle or the like runs on and applies a load to the coil unit CU1, shown in FIG. 13, in the state of being installed on the ground. In this case, the load received by the resin cover 61 is firstly transmitted to the plurality of cover ribs 61c. The load transmitted to the bottom-plate contact rib 61c2, among the plurality of cover ribs 61c, situated on the curved portion 61a2, is directly transmitted to the bottom plate 59. Thus, sufficient load bearing performance is ensured.

On the other hand, the load transmitted to the bobbin contact ribs 61c1, among the plurality of cover ribs 61c, situated on the flat plate portion 61a1, is transmitted to the coil bobbin 57. The load transmitted to the bobbin contact ribs 61c1, among the above bobbin contact ribs 61c1, situated at the positions corresponding to the upper-bobbin ribs 53c, is transmitted to the upper-bobbin ribs 53c, some protrusions 51a of the core base 51, the lower-bobbin ribs 55c of the lower bobbin 55, and the bottom plate 59 in this order, as can be seen well in FIG. 18 and FIG. 19. In this case, the bobbin contact ribs 61c1, the upper-bobbin ribs 53c, the protrusions 51a, and the lower-bobbin ribs 55c form columns extending in the up-down direction between the flat plate portion 61a1 of the resin cover 61 and the bottom plate 59. Thus, sufficient load bearing performance is ensured.

Also, the load transmitted to the bobbin contact ribs 61c1, among the plurality of cover ribs 61c, situated at the opposite end portions in the coil-axis intersecting direction Y is transmitted downward by the curved end portions 53b, 55b of the upper bobbin 53 and the lower bobbin 55, which are bent to face each other. Thus, sufficient load bearing performance is ensured.

Further, since the upper bobbin 53 and the lower bobbin 55 are in corrugated plate shapes, the upper bobbin 53 and the lower bobbin 55 themselves ensure sufficient load bearing performance against the load transmitted to the plurality of bobbin contact ribs 61c1 situated on the flat plate portion 61a1. In addition, the fact that the upper bobbin 53, the lower bobbin 55, and the core base 51 are made of glass-fiber reinforced plastic (GFRP) ensures even higher sufficient load bearing performance.

Here, the directions of orientation of the fibers in the glass-fiber reinforced plastic are the coil axis direction X and the coil-axis intersecting direction Y. Glass-fiber reinforced plastic exhibits higher strength in the directions of orientation of its fibers. In this embodiment, with the coil-axis intersecting direction Y set as a direction of orientation of fibers, fibers are oriented in the up-down direction at the protrusions 51a of the core base 51, as shown in FIG. 19. This improves the load bearing performance against the load received by the resin cover 61.

Also, with the coil axis direction X set as a direction of orientation of fibers, fibers are oriented along the direction along which are connected the protrusions on the front and back sides of the corrugated plate shape of each of the upper bobbin 53 and the lower bobbin 55, as shown in FIG. 18. In this case, the load received by the resin cover 61 is applied along the protrusions on the front and back sides. This improves the load bearing performance against the load received by the resin cover 61. Further, the coil wire 49 is wound such that it is inserted in the recesses of the corrugated plate shape. This makes the coil wire 49 less likely to be displaced, and also provides a protection function for the coil wire 49, thereby making the coil wire 49 less likely to be damaged.

Also, the columns formed by the upper-bobbin ribs 53c, some protrusions 51a, and the lower-bobbin ribs 55c, each extending in the coil axis direction X, can resist bending deformation of the coil bobbin 57 in the coil axis direction X. On the other hand, the corrugated plate shapes of the upper bobbin 53 and the lower bobbin 55 can resist bending deformation of the coil bobbin 57 in the coil-axis intersecting direction Y.

As described above, in this embodiment, the clearances C, extending along the coil axis direction X, are provided in the magnetic core 47. In this way, it is possible to ensure sufficient self-inductance L and coupling coefficient k and also ensure weight reduction and a sufficient outer diameter for the magnetic core 47, which makes it possible to achieve easier alignment between the power-transmission-side coil 11 and the power-reception-side coil 13. Here, the protrusions 51a, which are provided in the clearances C as reinforcement portions, as well as the bobbin contact ribs 61c1, the upper-bobbin ribs 53c, and lower-bobbin ribs 55c can ensure that the power-transmission-side coil unit CU1 is strong and rigid.

Part (a) of FIG. 20 is a perspective view showing the whole core base 51 in FIG. 16, and Part (b) of FIG. 20 is a perspective view showing a state where the split magnetic cores 47a are arranged on the core base 51 in Part (a) of FIG. 20. These figures correspond to the example where the intervals of the clearances C become smaller and smaller toward the outer sides in the coil-axis intersecting direction Y. On the other hand, Parts (a) and (b) of FIG. 21 show the example where the intervals of the clearances C are all equal. In Parts (a) and (b) of FIG. 21, the widths of the plurality of protrusions 51a of the core base 51 are all equal.

FIG. 22 shows a state where a power-reception-side coil unit CU2 is attached to the bottom 5a of the vehicle 5. As shown in FIG. 23, a bottom plate 73 of the power-reception-side coil unit CU2, corresponding to the bottom plate 59 of the power-transmission-side coil unit CU1 in FIG. 13, is attached to the bottom 5a of the vehicle 5. A coil bobbin 75 is attached to the lower surface of the bottom plate 73 through an insulation plate 77. Further, a resin cover 79 is fastened and fixed to the bottom plate 73 in such a way as to cover the coil bobbin 75.

FIG. 24 and FIG. 25 show part of the coil bobbin 75. FIG. 24 shows the surface facing the bottom 5a of the vehicle 5. FIG. 25 shows the opposite surface from FIG. 24, which faces the ground, together with the insulation plate 77. As in the coil bobbin 57 in FIG. 14, a magnetic core 47 is housed inside the coil bobbin 75, and a coil wire 49 is wound around the outside thereof.

The coil bobbin 75 includes an upper bobbin 81 situated on the vehicle 5 side and a lower bobbin 83 situated on the ground side. As in the upper bobbin 53 and the lower bobbin 55 in FIG. 14, the upper bobbin 81 and the lower bobbin 83 each have a corrugated plate shape in which recesses and protrusions appear repeatedly along the coil axis direction X. Moreover, the coil wire 49 is wound such that it is inserted in the recesses in the outer surface of this corrugated plate shape.

As shown in FIG. 24 and FIG. 25, as in the core base 51 in FIG. 17, the upper bobbin 81 includes attachment leg portions 81a at the four corners on its periphery for attachment to the bottom plate 73 through the insulation plate 77. Further, as in the core base 51 in FIG. 17, the upper bobbin 81 includes notches 81b in which to insert the coil wire 49 at opposite end portions in the coil-axis intersecting direction Y, and a pair of lock protrusions 81c on which to hook the coil wire 49. As shown in FIG. 24, the notches 81b and the lock protrusions 81c are formed at flanges 81d which are the opposite end portions in the coil-axis intersecting direction Y bent downward and extended horizontally.

Curved end portions 83a which are opposite end portions of the lower bobbin 83 in the coil-axis intersecting direction Y curved toward the upper bobbin 81 are in contact with the flanges 81d of the upper bobbin 81. In this contact state, the upper bobbin 81 and the lower bobbin 83 are fixed to each other at their opposite end portions in the coil axis direction X with clips 67 similar to those in FIG. 17.

As the magnetic core 47, a plurality of split magnetic cores 47a similar to those in FIG. 14 are arranged between the upper bobbin 81 and the lower bobbin 83 along the coil-axis intersecting direction Y with a clearance C therebetween. As in FIG. 14, the intervals of the clearances C becomes narrower and narrower toward the outer sides in the coil-axis intersecting direction Y. Moreover, upper-bobbin protrusions 81e protruding from the upper bobbin 81 toward the lower bobbin 83 are inserted and arranged in these clearances C. Lower-bobbin protrusions 83b protruding from the lower bobbin 83 toward the upper bobbin 81 are also inserted and arranged in the largest clearances C at the two center positions. The upper-bobbin protrusions 81e and the lower-bobbin protrusions 83b extend along the coil axis direction X.

As shown enlarged in FIG. 26, each upper-bobbin protrusion 81e includes two side walls 81e1 facing side surfaces of split magnetic cores 47a, and a bottom wall 81e2 connecting the tips of the two side walls 81e1 to each other. Each lower-bobbin protrusion 83b likewise includes two side walls 83b1 facing the side surfaces of the split magnetic cores 47a, and a bottom wall 83b2 connecting the tips of the two side walls 83b1 to each other.

The upper-bobbin protrusions 81e inserted in the largest clearances C at the two center positions and the lower-bobbin protrusions 83h have their bottom walls 81e2, 83b2 in contact with each other. That is, the lower ends of the upper-bobbin protrusions 81e and the upper ends of the lower-bobbin protrusion 83b are in contact with each other. Then, the ends in this contact state are fixed to each other as a fixed portion with a clip 67, as shown in FIG. 26. The clip 67 is locked to penetrating holes provided in the bottom walls 81e2, 83b2, by inserting a cylindrical female clip 67a into the penetrating holes and inserting a male clip 67b into the female clip 67a, thereby widening the outer diameter of the female clip 67a.

The upper-bobbin protrusions 81e inserted in the clearances C in which the lower-bobbin protrusions 83b are not inserted are such that the lower surfaces of their bottom walls 81e2 in FIG. 24 are in contact with the upper surface of the lower bobbin 83. Also, upper ribs 81f similar to the upper ribs 53h in FIG. 14 are formed between the upper-bobbin protrusions 81e of the upper bobbin 81. The upper ribs 81f are situated at positions corresponding to the magnetic core 47 but are separated from the magnetic core 47.

In the power-reception-side coil unit CU2, shown in FIG. 22 to FIG. 25 and attached to the vehicle 5 side, the upper-bobbin protrusions 81e and the lower-bobbin protrusions 83b as reinforcement portions are inserted and arranged in the clearances C, each formed between the split magnetic cores 47a. Thus, the upper-bobbin protrusions 81e and the lower-bobbin protrusions 83b ensure sufficient rigidity against vibration during travel of the vehicle or the like.

In the above-described power-reception-side coil unit CU2 too, the clearances C, extending along the coil axis direction X, are provided in the magnetic core 47. Hence, it is possible to ensure sufficient self-inductance L and coupling coefficient k and also ensure weight reduction and a sufficient outer diameter for the magnetic core 47, which makes it possible to achieve easier alignment between the power-transmission-side coil 11 and the power-reception-side coil 13. Here, the upper-bobbin protrusions 81e and the lower-bobbin protrusions 83b, which are provided in the clearances C as reinforcement portions, enhance the vertical load bearing characteristic between the upper bobbin 81 and the lower bobbin 83 of the coil bobbin 75.

Further, since the upper bobbin 81 and the lower bobbin 83 are in corrugated plate shapes, the upper bobbin 81 and the lower bobbin 83 themselves ensure sufficient load bearing performance. In addition, the fact that the upper bobbin 81 and the lower bobbin 83 are made of glass-fiber reinforced plastic (GFRP) ensures even higher load bearing performance. Hence, advantageous effects such as the above, similar to those by the coil bobbin 57 in FIG. 14, can be achieved.

Although an embodiment of the present invention has been described above, this embodiment is mere illustration of an example described to facilitate the understanding of the present invention. The present invention is not limited to the embodiment. The technical scope of the present invention is not limited to the specific technical matters disclosed in the embodiment, but includes various modifications, changes, alternative techniques, and the like that can be easily derived therefrom.

For example, the power-transmission-side coil unit CU1, shown in FIG. 13, may be attached to the bottom 5a of the vehicle 5 and utilized as the power-reception-side coil unit.

INDUSTRIAL APPLICABILITY

The present invention is applicable to wireless power supply coils configured to wirelessly transmit or receive power.

REFERENCE SIGNS LIST

X coil axis direction
Y coil-axis intersecting direction
C clearance between split magnetic bodies
11 power-transmission-side coil
13 power-reception-side coil
47 magnetic core (magnetic body)
47a split magnetic core (split magnetic body)
49 coil wire (conductive wire)

The invention claimed is:

1. A wireless power supply coil being at least one of a power-transmission-side coil or a power-reception-side coil configured to wirelessly transmit or receive power, the wireless power supply coil comprising:
   a conductive wire wound annularly; and
   a magnetic body arranged inside the conductive wire, wherein
   the magnetic body is split along a coil-axis intersecting direction into a plurality of split magnetic bodies, the coil-axis intersecting direction intersecting a coil axis direction of the coil, the conductive wire being wound around the magnetic body,
   a plurality of clearances are provided along the coil-axis intersecting direction, each clearance extending along the coil axis direction between respective split magnetic bodies, and
   among the plurality of clearances, a clearance on an outer side in the coil-axis intersecting direction is smaller than a clearance at a center in the coil-axis intersecting direction.

2. A wireless power supply coil being at least one of a power-transmission-side coil or a power-reception-side coil configured to wirelessly transmit or receive power, the wireless power supply coil comprising:
   a conductive wire wound annularly; and
   a magnetic body arranged inside the conductive wire, wherein
   the magnetic body is split along a coil-axis intersecting direction into a plurality of split magnetic bodies, the coil-axis intersecting direction intersecting a coil axis direction of the coil, the conductive wire being wound around the magnetic body,
   a clearance extending along the coil axis direction is provided between the plurality of split magnetic bodies, and
   among the plurality of split magnetic bodies, a split magnetic body on an outer side in the coil-axis intersecting direction has a larger projected area in the coil axis direction than a projected area in the coil axis direction, of a split magnetic body at a center in the coil-axis intersecting direction.

3. The wireless power supply coil according to claim 2, wherein among the plurality of split magnetic bodies, the split magnetic body on the outer side in the coil-axis intersecting direction is larger in width in the coil-axis intersecting direction than the split magnetic body at the center in the coil-axis intersecting direction.

4. The wireless power supply coil according to claim 2, wherein among the plurality of split magnetic bodies, the split magnetic body on the outer side in the coil-axis intersecting direction is larger in thickness in a direction perpendicular to both of the coil axis direction and the coil-axis intersecting direction than the split magnetic body at the center in the coil-axis intersecting direction.

5. The wireless power supply coil according to claim 2, wherein among the plurality of split magnetic bodies, the split magnetic body on the outer side in the coil-axis intersecting direction is larger in volume than the split magnetic body at the center in the coil-axis intersecting direction.

6. The wireless power supply coil according to claim 1, wherein the plurality of split magnetic bodies are identical to each other in shape.

7. The wireless power supply coil according to claim 1, wherein the clearance is parallel to the coil axis direction.

* * * * *